US012647464B2

(12) United States Patent
Crabtree et al.

(10) Patent No.: US 12,647,464 B2
(45) Date of Patent: *Jun. 2, 2026

(54) MASSIVELY SCALABLE COMPUTER PLATFORM USING A DISTRIBUTED COMPUTATIONAL GRAPH

(71) Applicant: QOMPLX LLC, Reston, VA (US)

(72) Inventors: Jason Crabtree, Vienna, VA (US); Andrew Sellers, Monument, CO (US)

(73) Assignee: QOMPLX LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/581,375

(22) Filed: Feb. 20, 2024

(65) Prior Publication Data

US 2024/0195842 A1     Jun. 13, 2024

Related U.S. Application Data

(63) Continuation of application No. 17/189,161, filed on Mar. 1, 2021, which is a continuation-in-part of
(Continued)

(51) Int. Cl.
*H04L 9/40* (2022.01)
*G06F 9/48* (2006.01)
(Continued)

(52) U.S. Cl.
CPC ............ *H04L 63/20* (2013.01); *G06F 9/5038* (2013.01); *G06F 16/2477* (2019.01);
(Continued)

(58) Field of Classification Search
CPC . H04L 63/20; H04L 63/1425; H04L 63/1441; G06F 16/2477; G06F 16/951; G06F 9/5038; G06F 9/4881
See application file for complete search history.

(56) References Cited

U.S. PATENT DOCUMENTS 6,629,167 B1 * 9/2003 Undy .................... G06F 9/3867
                                                    712/E9.046
7,725,345 B2 * 5/2010 Furin ................. G06Q 10/0637
                                                    705/7.29
(Continued)

FOREIGN PATENT DOCUMENTS

WO          0163534 A2    8/2001
WO      2015094545 A1    6/2015

*Primary Examiner* — Yonas A Bayou
(74) *Attorney, Agent, or Firm* — NK Patent Law

(57)     ABSTRACT
A system for repeatable and flexible predictive analysis of very large data sets using a distributed computational graph using a domain specific language for pipeline and resource declaration has been developed. Data receipt software receives data from one or more sources. In a declared data pathway, data formalization software formats input data for storage, enrichment, or continued processing. An event analysis server inspects stored data for trends, situations, or knowledge. Aggregated data is passed to event message store and data stream handler software. Transformation pipeline software stores, triggers, executes and monitors declared transformation steps and pipelines to manipulate and act on bulk data and data streams, provides results and enables dynamic model and routine re-training and learning.

36 Claims, 16 Drawing Sheets

Related U.S. Application Data application No. 17/061,195, filed on Oct. 1, 2020, now Pat. No. 11,570,214, which is a continuation-in-part of application No. 17/035,029, filed on Sep. 28, 2020, now Pat. No. 11,546,380, which is a continuation-in-part of application No. 17/008,276, filed on Aug. 31, 2020, now Pat. No. 11,323,484, which is a continuation-in-part of application No. 17/000,504, filed on Aug. 24, 2020, now Pat. No. 11,477,245, which is a continuation-in-part of application No. 16/855,724, filed on Apr. 22, 2020, now Pat. No. 11,218,510, which is a continuation-in-part of application No. 16/836,717, filed on Mar. 31, 2020, now Pat. No. 10,917,428, and a continuation-in-part of application No. 16/777,270, filed on Jan. 30, 2020, now Pat. No. 11,025,674, which is a continuation-in-part of application No. 16/720,383, filed on Dec. 19, 2019, now Pat. No. 10,944,795, said application No. 17/189,161 is a continuation-in-part of application No. 16/709,598, filed on Dec. 10, 2019, now Pat. No. 11,507,858, said application No. 17/000,504 is a continuation-in-part of application No. 16/412,340, filed on May 14, 2019, now Pat. No. 11,539,663, which is a continuation-in-part of application No. 16/267,893, filed on Feb. 5, 2019, now abandoned, which is a continuation-in-part of application No. 16/248,133, filed on Jan. 15, 2019, now abandoned, said application No. 16/836,717 is a continuation-in-part of application No. 15/887,496, filed on Feb. 2, 2018, now Pat. No. 10,783,241, said application No. 17/061,195 is a continuation-in-part of application No. 15/879,801, filed on Jan. 25, 2018, now abandoned, said application No. 16/248,133 is a continuation-in-part of application No. 15/849,901, filed on Dec. 21, 2017, now Pat. No. 11,023,284, which is a continuation-in-part of application No. 15/835,436, filed on Dec. 7, 2017, now Pat. No. 10,572,828, and a continuation-in-part of application No. 15/835,312, filed on Dec. 7, 2017, now Pat. No. 11,055,451, said application No. 16/720,383 is a continuation of application No. 15/823,363, filed on Nov. 27, 2017, now Pat. No. 10,560,483, said application No. 15/887,496 is a continuation-in-part of application No. 15/823,285, filed on Nov. 27, 2017, now Pat. No. 10,740,096, and a continuation-in-part of application No. 15/818,733, filed on Nov. 20, 2017, now Pat. No. 10,673,887, said application No. 16/248,133 is a continuation-in-part of application No. 15/813,097, filed on Nov. 14, 2017, now abandoned, and a continuation-in-part of application No. 15/806,697, filed on Nov. 8, 2017, now abandoned, said application No. 15/835,436 is a continuation-in-part of application No. 15/790,457, filed on Oct. 23, 2017, now Pat. No. 10,884,999, which is a continuation-in-part of application No. 15/790,327, filed on Oct. 23, 2017, now Pat. No. 10,860,951, said application No. 15/823,285 is a continuation-in-part of application No. 15/788,718, filed on Oct. 19, 2017, now Pat. No. 10,861,014, which is a continuation-in-part of application No. 15/788,002, filed on Oct. 19, 2017, now abandoned, which is a continuation-in-part of application No. 15/787,601, filed on Oct. 18, 2017, now Pat. No. 10,860,660, said application No. 15/818,733 is a continuation-in-part of application No. 15/725,274, filed on Oct. 4, 2017, now Pat. No. 10,609,079, said application No. 15/823,363 is a continuation-in-part of application No. 15/725,274, filed on Oct. 4, 2017, now Pat. No. 10,609,079, said application No. 16/248,133 is a continuation-in-part of application No. 15/673,368, filed on Aug. 9, 2017, now abandoned, said application No. 15/725,274 is a continuation-in-part of application No. 15/655,113, filed on Jul. 20, 2017, now Pat. No. 10,735,456, said application No. 15/813,097 is a continuation-in-part of application No. 15/616,427, filed on Jun. 7, 2017, now abandoned, said application No. 15/655,113 is a continuation-in-part of application No. 15/616,427, filed on Jun. 7, 2017, now abandoned, said application No. 15/790,327 is a continuation-in-part of application No. 15/616,427, filed on Jun. 7, 2017, now abandoned, said application No. 15/787,601 is a continuation-in-part of application No. 15/616,427, filed on Jun. 7, 2017, now abandoned, said application No. 15/879,801 is a continuation-in-part of application No. 15/379,899, filed on Dec. 15, 2016, now abandoned, said application No. 15/673,368 is a continuation-in-part of application No. 15/376,657, filed on Dec. 13, 2016, now Pat. No. 10,402,906, said application No. 15/806,697 is a continuation-in-part of application No. 15/376,657, filed on Dec. 13, 2016, now Pat. No. 10,402,906, said application No. 15/379,899 is a continuation-in-part of application No. 15/376,657, filed on Dec. 13, 2016, now Pat. No. 10,402,906, said application No. 15/806,697 is a continuation-in-part of application No. 15/343,209, filed on Nov. 4, 2016, now Pat. No. 11,087,403, said application No. 15/376,657 is a continuation-in-part of application No. 15/237,625, filed on Aug. 15, 2016, now Pat. No. 10,248,910, said application No. 15/655,113 is a continuation-in-part of application No. 15/237,625, filed on Aug. 15, 2016, now Pat. No. 10,248,910, said application No. 15/343,209 is a continuation-in-part of application No. 15/237,625, filed on Aug. 15, 2016, now Pat. No. 10,248,910, and a continuation-in-part of application No. 15/229,476, filed on Aug. 5, 2016, now Pat. No. 10,454,791, said application No. 15/237,625 is a continuation-in-part of application No. 15/206,195, filed on Jul. 8, 2016, now abandoned, said application No. 15/229,476 is a continuation-in-part of application No. 15/206,195, filed on Jul. 8, 2016, now abandoned, which is a continuation-in-part of application No. 15/186,453, filed on Jun. 18, 2016, now abandoned, said application No. 15/835,312 is a continuation-in-part of application No. 15/186,453, filed on Jun. 18, 2016, now abandoned, which is a continuation-in-part of application No. 15/166,158, filed on May 26, 2016, now abandoned, said application No. 15/790,327 is a continuation-in-part of application No. 15/141,752, filed on Apr. 28, 2016, now Pat. No. 10,860,962, said application No. 15/166,158 is a continuation-in-part of application No. 15/141,752, filed on Apr. 28, 2016, now Pat. No. 10,860,962, which is a continuation-in-part of application No. 15/091,563, filed on Apr. 5, 2016, now Pat. No. 10,204,147, and a continuation-in-part of application No. 14/986,536, filed on Dec. 31, 2015, now Pat. No. 10,210,255, said application No. 16/709,598 is a continuation-in-part of application No. 14/925,974, filed on Oct. 28, 2015, now abandoned, said application No. 15/616,427 is a continuation-in-part of application No. 14/925,974, filed on Oct. 28, 2015, now abandoned, said application No. 15/141,752 is a continuation-in-part of application No. 14/925,974, filed on Oct. 28, 2015, now abandoned.

(60) Provisional application No. 62/568,298, filed on Oct. 4, 2017, provisional application No. 62/568,312, filed on Oct. 4, 2017, provisional application No. 62/568,305, filed on Oct. 4, 2017, provisional application No. 62/568,291, filed on Oct. 4, 2017, provisional application No. 62/568,307, filed on Oct. 4, 2017.

(51) Int. Cl.
| | |
|---|---|
| *G06F 9/50* | (2006.01) |
| *G06F 16/2458* | (2019.01) |
| *G06F 16/951* | (2019.01) |

(52) U.S. Cl.
CPC ........ *G06F 16/951* (2019.01); *H04L 63/1425* (2013.01); *H04L 63/1441* (2013.01); *G06F 9/4881* (2013.01)

(56) References Cited

U.S. PATENT DOCUMENTS

| | | | | |
|---|---|---|---|---|
| 7,818,224 | B2 | 10/2010 | Boerner | |
| 7,818,417 | B2 | 10/2010 | Ginis et al. | |
| 7,840,677 | B2 | 11/2010 | Li et al. | |
| 8,069,190 | B2 | 11/2011 | Mccoll et al. | |
| 8,156,029 | B2 | 4/2012 | Szydlo et al. | |
| 8,200,527 | B1 * | 6/2012 | Thompson | G06Q 30/00 705/7.41 |
| 8,244,567 | B2 * | 8/2012 | Estill | G06Q 30/02 705/7.14 |
| 8,255,316 | B2 * | 8/2012 | Bal | G06Q 10/0631 705/37 |
| 8,311,863 | B1 * | 11/2012 | Kemp | G06Q 10/0639 705/7.29 |
| 8,352,347 | B2 | 1/2013 | Thomas et al. | |
| 8,370,192 | B2 | 2/2013 | Deo et al. | |
| 8,812,331 | B2 * | 8/2014 | Jones | G06Q 10/10 705/4 |
| 8,818,838 | B1 * | 8/2014 | Sharma | G06Q 30/0202 705/7.29 |
| 8,819,833 | B2 * | 8/2014 | Markham | H04L 63/0209 726/25 |
| 8,909,762 | B2 * | 12/2014 | Wang | H04L 41/145 709/224 |
| 9,338,061 | B2 | 5/2016 | Chen et al. | |
| 9,461,876 | B2 | 10/2016 | Van Dusen et al. | |
| 9,639,575 | B2 | 5/2017 | Leida et al. | |
| 9,721,086 | B2 | 8/2017 | Shear et al. | |
| 10,168,691 | B2 | 1/2019 | Zornio et al. | |
| 10,210,246 | B2 | 2/2019 | Stojanovic et al. | |
| 10,740,358 | B2 | 8/2020 | Chan et al. | |
| 10,817,530 | B2 | 10/2020 | Siebel et al. | |
| 2005/0209993 | A1 | 9/2005 | Koehler | |
| 2007/0168370 | A1 | 7/2007 | Hardy | |
| 2007/0174233 | A1 | 7/2007 | Ginis et al. | |
| 2009/0171999 | A1 | 7/2009 | Mccoll et al. | |
| 2009/0235251 | A1 | 9/2009 | Li et al. | |
| 2013/0262443 | A1 | 10/2013 | Leida et al. | |
| 2013/0290554 | A1 | 10/2013 | Chen et al. | |
| 2015/0254330 | A1 | 9/2015 | Chan et al. | |
| 2016/0092557 | A1 | 3/2016 | Stojanovic et al. | |
| 2016/0098037 | A1 | 4/2016 | Zornio et al. | |
| 2016/0358102 | A1 | 12/2016 | Bowers et al. | |
| 2017/0006135 | A1 | 1/2017 | Siebel et al. | |
| 2017/0090893 | A1 | 3/2017 | Aditya et al. | |
| 2019/0155646 | A1 | 5/2019 | Bishop et al. | |

* cited by examiner

Input Devices 270

Output Devices 260

Storage Devices 250

Memory 240

Client Applications 230

Shared Services 225

Operating Systems 220

Processor(s) 210

200

1500

MASSIVELY SCALABLE COMPUTER PLATFORM USING A DISTRIBUTED COMPUTATIONAL GRAPH

CROSS-REFERENCE TO RELATED APPLICATIONS

Priority is claimed in the application data sheet to the following patents or patent applications, each of which is expressly incorporated herein by reference in its entirety:
Ser. No. 17/189,161
Ser. No. 17/061,195
Ser. No. 17/035,029
Ser. No. 17/008,276
Ser. No. 17/000,504
Ser. No. 16/855,724
Ser. No. 16/836,717
Ser. No. 15/887,496
Ser. No. 15/823,285
Ser. No. 15/788,718
Ser. No. 15/788,002
Ser. No. 15/787,601
Ser. No. 62/568,312
Ser. No. 15/616,427
Ser. No. 14/925,974
Ser. No. 62/568,305
Ser. No. 62/568,307
Ser. No. 15/818,733
Ser. No. 15/725,274
Ser. No. 15/655,113
Ser. No. 15/237,625
Ser. No. 15/206,195
Ser. No. 15/186,453
Ser. No. 15/166,158
Ser. No. 15/141,752
Ser. No. 15/091,563
Ser. No. 14/986,536
Ser. No. 16/777,270
Ser. No. 16/720,383
Ser. No. 15/823,363
Ser. No. 16/412,340
Ser. No. 16/267,893
Ser. No. 16/248,133
Ser. No. 15/849,901
Ser. No. 15/835,436
Ser. No. 15/790,457
Ser. No. 15/790,327
62/568,291
62/568,298
Ser. No. 15/835,312
Ser. No. 15/813,097
Ser. No. 15/806,697
Ser. No. 15/376,657
Ser. No. 15/343,209
Ser. No. 15/229,476
Ser. No. 15/673,368
Ser. No. 15/879,801
Ser. No. 15/379,899
Ser. No. 16/709,598

BACKGROUND OF THE INVENTION

Field of the Invention

The present invention is in the field of analysis of very large data sets using distributed computational graph tools which allow for transformation of data through both linear and non-linear transformation pipelines.

Discussion of the State of the Art

The ability to transfer information between individuals, even over large distances, is credited with allowing mankind to rise from a species of primate gatherer-scavengers to forming simple communities. The ability to stably record information so that it could be analyzed for repetitive events, trends, and serve as a base to be expanded and built upon. It is safe to say that the availability of information in formats that allow it to be analyzed and added to by both individuals contemporary to its accrual and those who come after is the most powerful tool available to mankind and likely is what has propelled us to the level of social and technological achievement we have attained.

Nothing has augmented our ability to gather and store information analogous to the rise of electronic and computer technology. There are sensors of all types to measure just about any condition one can imagine. Computers have allowed the health information for a large portion of the human population is stored and accessible. Similarly, detailed data on vehicular accidents, both environmental and vehicle component factors Airline mishaps and crashes can be recreated and studied in great detail. Item information is recorded for the majority of consumer purchases. Further examples abound, but the point has been made. Computer database technology has allowed all of this information to be reliably stored for future retrieval and analysis. The benefits of database technology are so strong that there are very few businesses large or small that do not make some use of a data and knowledge storage solution, either directly for such tasks as inventory control and forecasting or customer relations, or indirectly for ordering. The meteoric rise of computer networking the internet has only served to turn the accrual of information into a torrent as now huge populations can exchange observations, data and ideas, even invited to do so; vast arrays of sensors can be tied together in meaningful ways all of which can be stored for future analysis and use. The receipt and storage of data has gotten to the point where an expert has been quoted as estimating that as much data is currently accrued in two days as was accrued in all history prior to 2003 (Eric Schmidt, Google). Entirely new distributed data storage and retrieval technologies such as Hadoop, and map/reduce; and graph and column based data store organization have been developed to accommodate the influx of information and provide some ability to retrieve information in a guided fashion, but such retrieval has proven to be too labor intensive and rigid to be of use in all but the more superficial and simple of campaigns. Presently, we are accruing vast amounts of information daily but do not have the tools to analyze all but a trickle into knowledge or informed action. What is needed is a system to allow the analysis of current, possibly complex and changing streaming data of interest in the context of the vast stored data that has accumulated relating to it such that meaningful conclusions made and effective action can be taken. To be of use, such a system would also need to possess the ability to self-assess its own operations and key intermediate factors in both the data stream and stored information and make changes to its own function to optimize function and maximize the probability of reliable conclusions.

Data pipelines, which are a progression of functions which each perform some action or transformation on a data stream, offer a mechanism to process quantities of data in the volume discussed directly above. To date however, data pipelines have either been extremely limited in what they do, for example "move data from a web based merchant site to a distributed data store; extract all purchases and classify by product type and region; store the result logs" or have been rigidly programmed and possibly required the uses of highly specific remote protocol calls to perform needed tasks. Even with these additions their capabilities have been very limited and, they have all been linear in configuration which precludes their use for analysis and conclusion or action discovery in a majority of complex situations where branching or even recurrent modification is needed.

What is needed is a system that intelligently combines processing of a current data stream with the ability to retrieve relevant stored data in such a way that conclusions or actions could be drawn in a predictive manner. To work in a timely and efficient manner, the system needs the ability to monitor for both operational issues within its components and should be able to learn and react to intermediate determinations of the analyses it runs and also should be able to self-modify to maintain optimal operation.

SUMMARY OF THE INVENTION

The inventor has developed a system for rapid predictive analysis of very large data sets using a distributed computational graph, that intelligently combines processing of a current data stream with the ability to retrieve relevant stored data in such a way that conclusions or actions could be drawn in a predictive manner.

According to a preferred embodiment of the invention, a system for rapid predictive analysis of very large data sets using the distributed computational graph, comprising a data receipt software module, a data filter software module, a data formalization software module, an input event data store module, a batch event analysis server, a system sanity and retrain software module, a messaging software module, a transformation pipeline software module, and an output software module, is disclosed. The data receipt software module: receives streams of input from one or more of a plurality of data sources, and sends the data stream to the data filter module. The filter software module: receives streams of data from the data receipt software module; removes data records from the stream for a plurality of reasons drawn from, but not limited to, a set comprising absence of all information, damage to data in the record, and presence of in-congruent information or missing information which invalidates the data record; splits filtered data stream into two or more identical parts; sends one identical data stream to the data formalization software module; and sends another identical data stream to the transformation pipeline module of the distributed graph computational module. The data formalization module: receives data stream from the data filter software module; formats the data within data stream based upon a set of predetermined parameters so as to prepare for meaningful storage in a data store; and places the formatted data stream into the input event data store. The input event data store: receives properly formatted data from the data formalization module; and stores the data by method suited to the long term availability, timely retrieval, and analysis of the accumulated data; The batch event analysis server: accesses the data store for information of interest based upon a set of predetermined parameters; aggregates data retrieved from the data store as predetermined that represent such interests as trends of importance, past instances of an event or set of events within a system under analysis or possible cause and effect relationships between two or more variables over many iterations; and provides summary information based upon the breadth of the data analyzed to the messaging software module; and receives communication from the messaging software module which may be in the form of requests for particular information or directives concerning the information being supplied at that time. The batch event analysis may be configured to process streaming data in addition to, or alternatively to batch data. The transformation pipeline software module: receives streaming data from the data filter software module; performs one or more functions on data within data stream; provides data resultant from the set of function pipeline back to the system; and receives directives from the system sanity and retrain module to modify the function of the pipeline. The messaging software module: receives administrative directives from those conducting the analysis; receives data store analysis summaries from batch event analysis server; receives results of pipeline data functions from transformation pipeline software module; and sends data analysis status and progress related messages as well as administrative execution directives to the system sanity and retrain software module. The system sanity and retrain software module: receives data analysis status and progress information from the messaging software module; compares all incoming information against preassigned parameters to ensure system stability; changes operational behavior within other software modules of system using preexisting guidelines to return required system function; sends alert signal through the output module concerning degraded system status as necessary; and receives and applies any administrative requests for changes in system function. Finally, the output module: receives information destined for outside of the system; formats that information based upon designated end target; and routes that information to the proper port for intended further action. Each of these system may operate as one or more nodes functioning in unison.

According to another preferred embodiment of the invention, a method for a system for the predictive analysis of very large data sets using the distributed computational graph, the method comprising the following steps: To receive streaming input from one or more of a plurality of data sources. To filter data of incomplete, misconfigured or damaged input. To formalize input data for use in batch and streaming portions of method using pre-designed standard. To perform a set of one or more data transformations on formalized input. To perform sanity checks of results of transformation pipeline analysis of streaming data as well as analysis process retraining based upon batch analysis of input data.

According to another preferred embodiment of the invention, a computing system for repeatable and flexible predictive analysis of very large data sets using a distributed computational graph employing a massively scalable compute platform, the computing system comprising: one or more hardware processor configured for: receiving streams of input from one or more of a plurality of data sources; filtering data from the stream based on data validity rules; and instantiating a distributed computation graph comprising one or more data transformation pipelines, wherein each transformation pipeline comprises a plurality of nodes which are programmed functions that act on input data and produce output data and a plurality of edges between nodes which are messages carrying data between nodes; processing the stream using the distributed computation graph; during processing of the stream using the distributed computation graph: analyzing output data from a plurality of nodes of one or more of the plurality of transformation pipelines; analyzing operational performance of the distributed computation graph; reconfiguring one or more transformation pipelines based on the analyses of output data and operational performance; and sending one or more output streams to requesting devices on the network.

According to another preferred embodiment of the invention, a computer-implemented method executed on a massively scalable compute platform for using a distributed computation graph for repeatable and flexible predictive analysis of very large data sets using a distributed computational graph, the computer-implemented method comprising: receiving streams of input from one or more of a plurality of data sources; filtering data from the stream based on data validity rules; and instantiating a distributed computation graph comprising one or more data transformation pipelines, wherein each transformation pipeline comprises a plurality of nodes which are programmed functions that act on input data and produce output data and a plurality of edges between nodes which are messages carrying data between nodes; processing the stream using the distributed computation graph; during processing of the stream using the distributed computation graph: analyzing output data from a plurality of nodes of one or more of the plurality of transformation pipelines; analyzing operational performance of the distributed computation graph; reconfiguring one or more transformation pipelines based on the analyses of output data and operational performance; and sending one or more output streams to requesting devices on the network.

According to another preferred embodiment, a system for repeatable and flexible predictive analysis of very large data sets using a distributed computational graph employing a massively scalable compute platform, comprising one or more computers with executable instructions that, when executed, cause the system to: receive streams of input from one or more of a plurality of data sources; filtering data from the stream based on data validity rules; and instantiate a distributed computation graph comprising one or more data transformation pipelines, wherein each transformation pipeline comprises a plurality of nodes which are programmed functions that act on input data and produce output data and a plurality of edges between nodes which are messages carrying data between nodes; process the stream using the distributed computation graph; during processing of the stream using the distributed computation graph: analyze output data from a plurality of nodes of one or more of the plurality of transformation pipelines; analyze operational performance of the distributed computation graph; reconfigure one or more transformation pipelines based on the analyses of output data and operational performance; and send one or more output streams to requesting devices on the network.

According to another preferred embodiment, non-transitory, computer-readable storage media having computer executable instructions embodied thereon that, when executed by one or more processors of a computing system employing a massively scalable compute platform for repeatable and flexible predictive analysis of very large data sets using a distributed computational graph, cause the computing system to: receive streams of input from one or more of a plurality of data sources; filter data from the stream based on data validity rules; and instantiate a distributed computation graph comprising one or more data transformation pipelines, wherein each transformation pipeline comprises a plurality of nodes which are programmed functions that act on input data and produce output data and a plurality of edges between nodes which are messages carrying data between nodes; process the stream using the distributed computation graph; during processing of the stream using the distributed computation graph: analyze output data from a plurality of nodes of one or more of the plurality of transformation pipelines; analyze operational performance of the distributed computation graph; reconfigure one or more transformation pipelines based on the analyses of output data and operational performance; and send one or more output streams to requesting devices on the network.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

Figure 4:
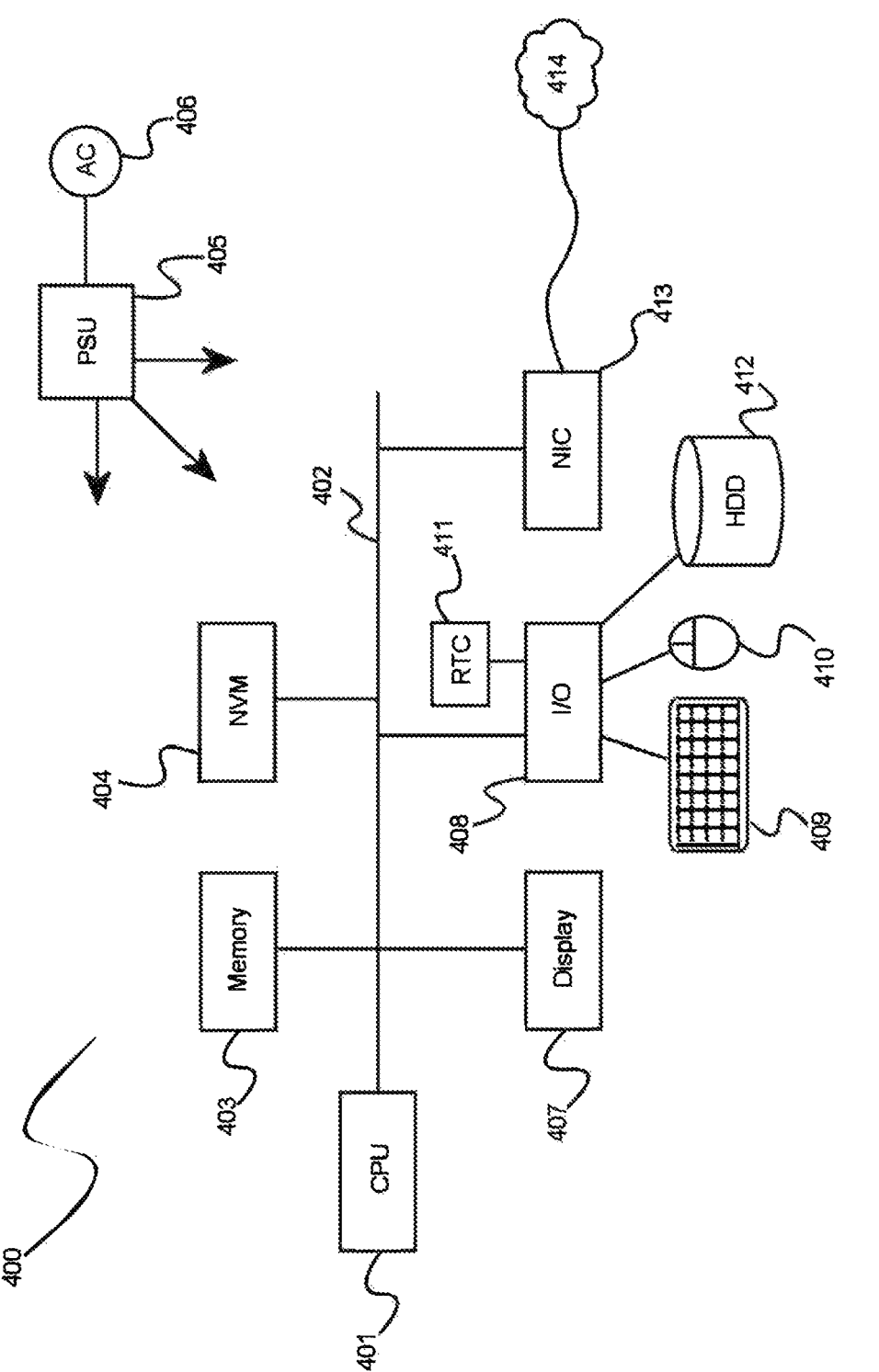
Figure 5:
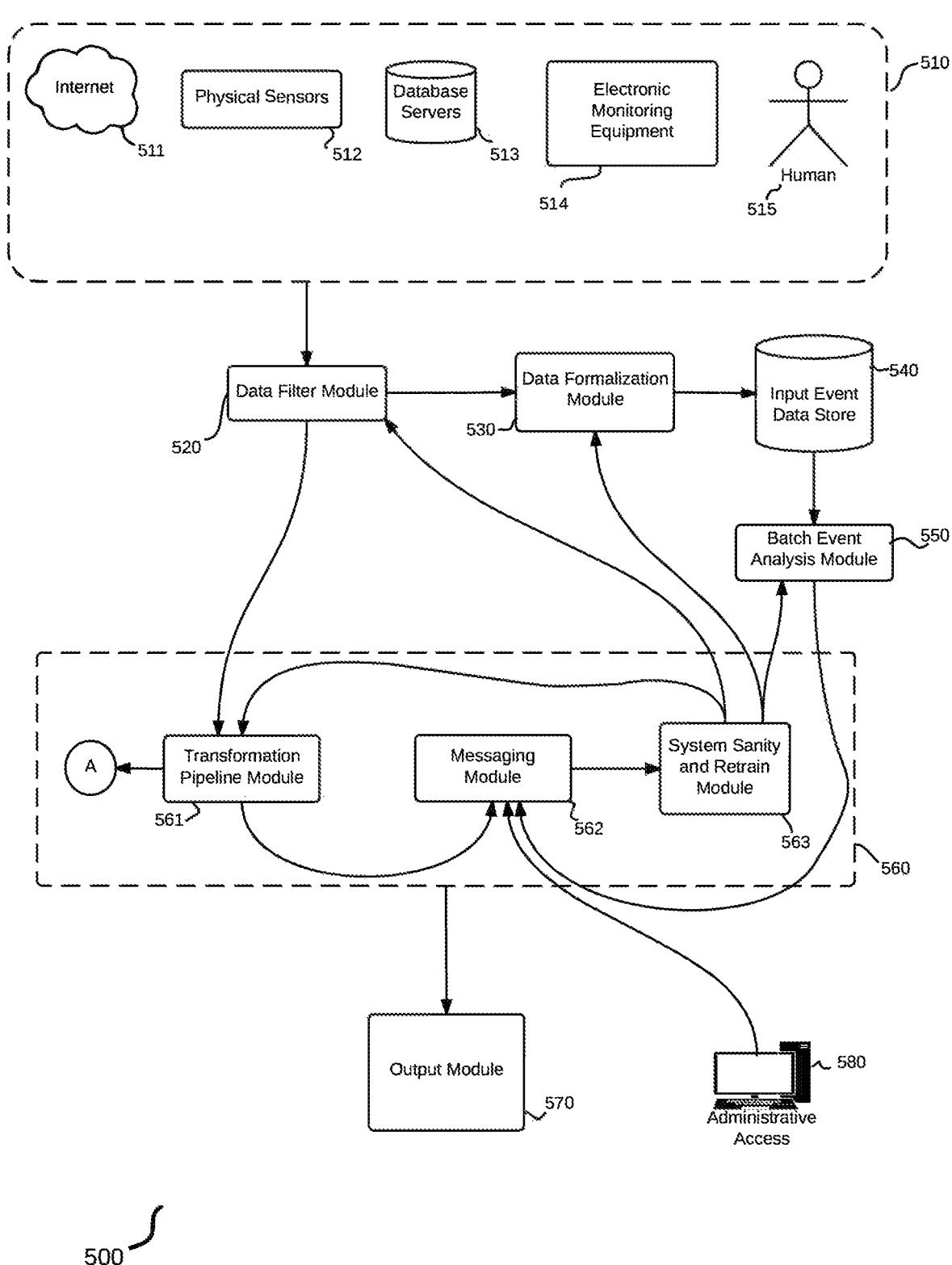

FIG. 4 is a block diagram illustrating an exemplary overview of a computer system as may be used in any of the various locations throughout the system FIG. 5 is a diagram of an exemplary architecture for a system where streams of input data from one or more of a plurality of sources are analyzed to predict outcome using both batch analysis of acquired data and transformation pipeline manipulation of current streaming data according to an embodiment of the invention.

Figure 6:
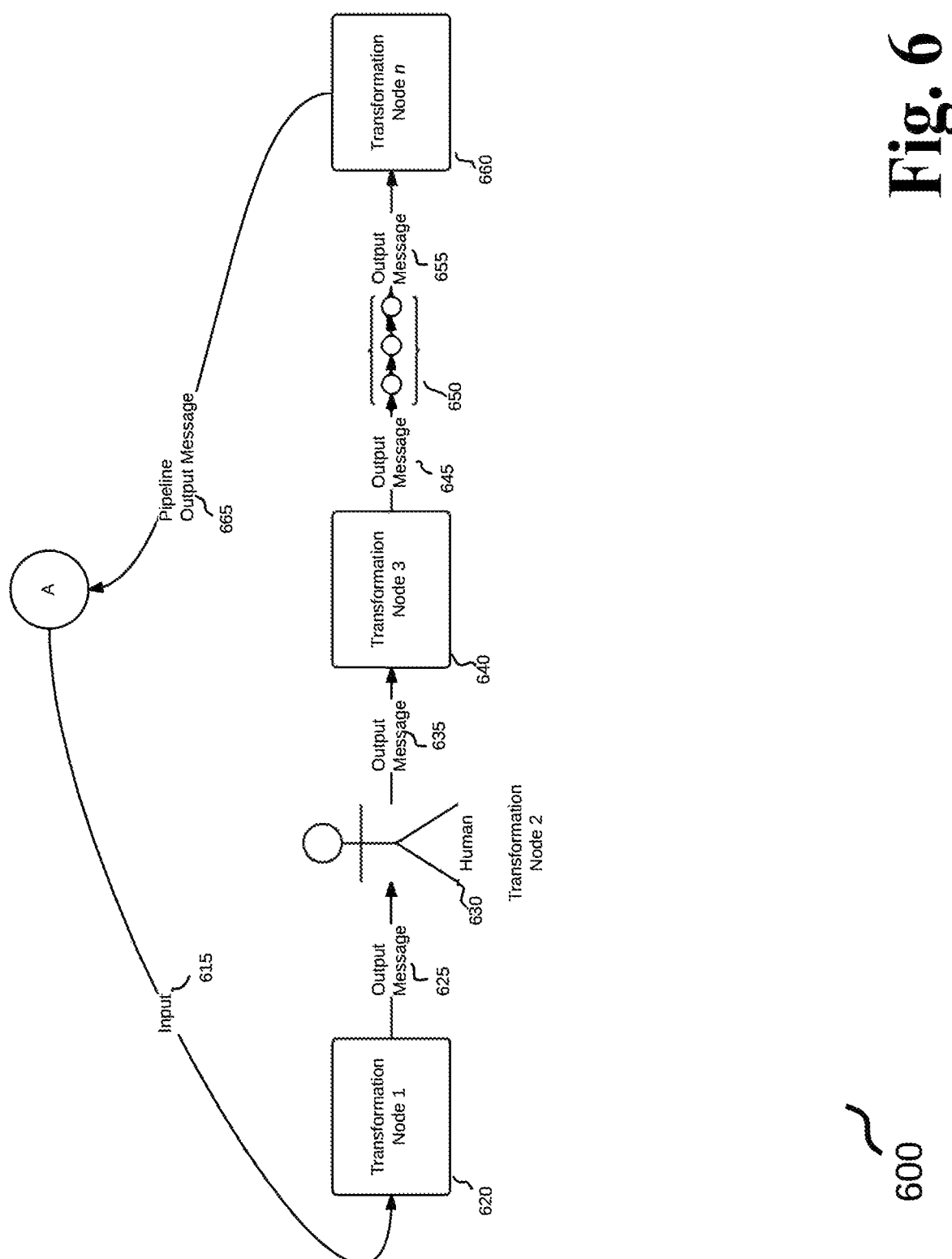

FIG. 6 is a diagram of an exemplary architecture for a linear transformation pipeline system which introduces the concept of the transformation pipeline as a directed graph of transformation nodes and messages according to an embodiment of the invention.

Figure 7:
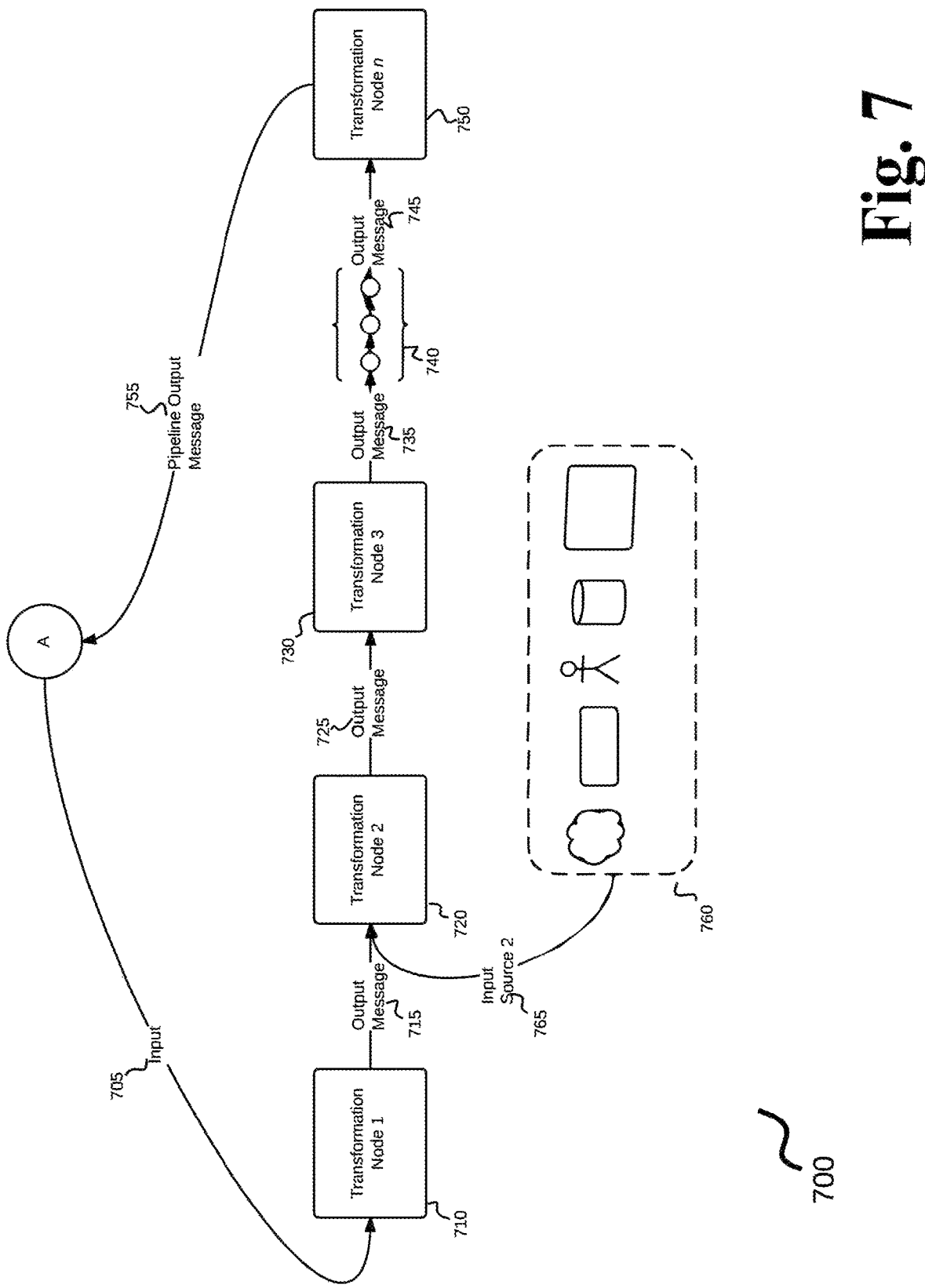

FIG. 7 is a diagram of an exemplary architecture for a transformation pipeline system where one of the transformations receives input from more than one source which introduces the concept of the transformation pipeline as a directed graph of transformation nodes and messages according to an embodiment of the invention.

Figure 8:
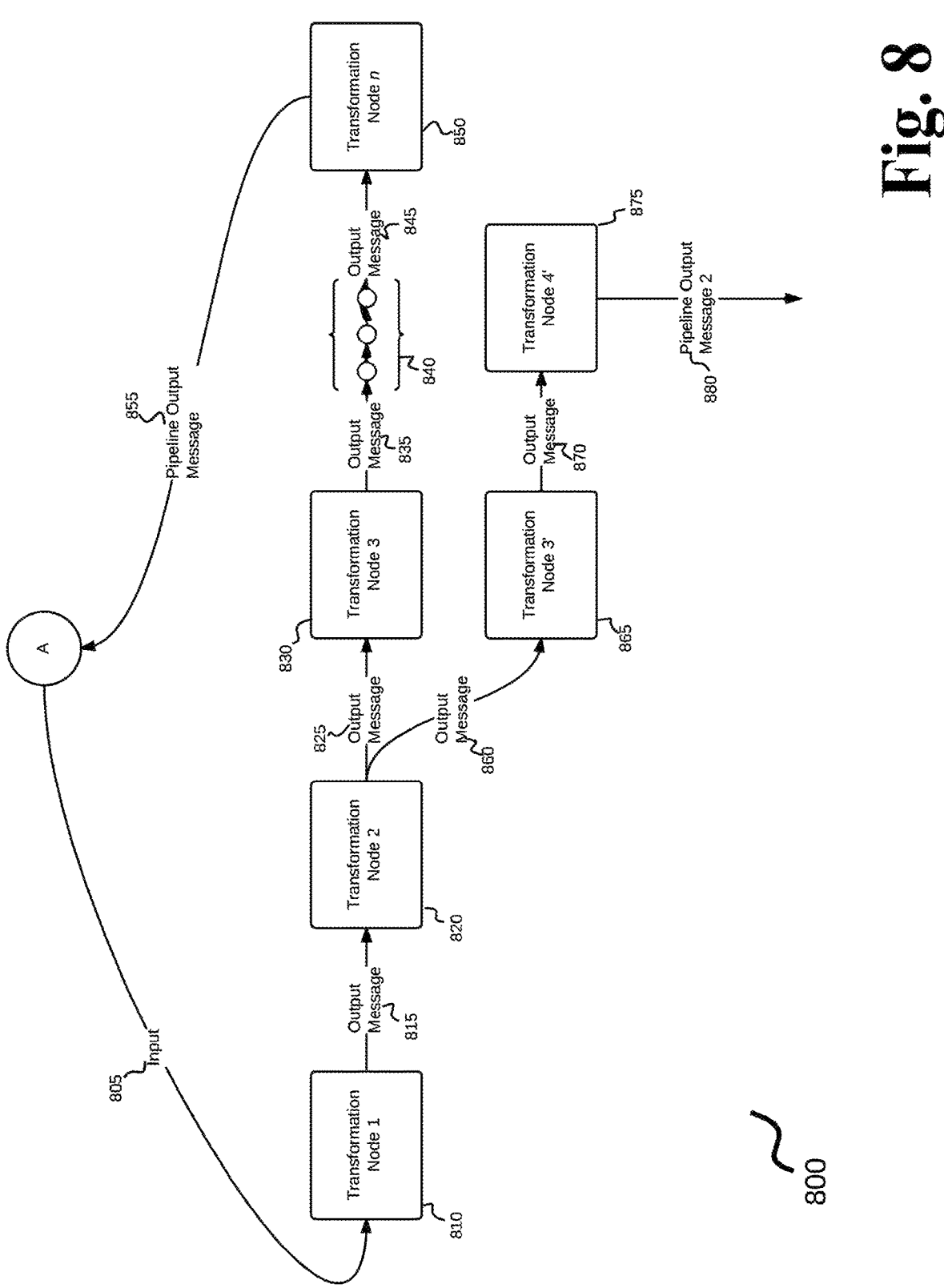

FIG. 8 is a diagram of an exemplary architecture for a transformation pipeline system where the output of one data transformation servers as the input of more than one downstream transformation which introduces the concept of the transformation pipeline as a directed graph of transformation nodes and messages according to an embodiment of the invention.

Figure 9:
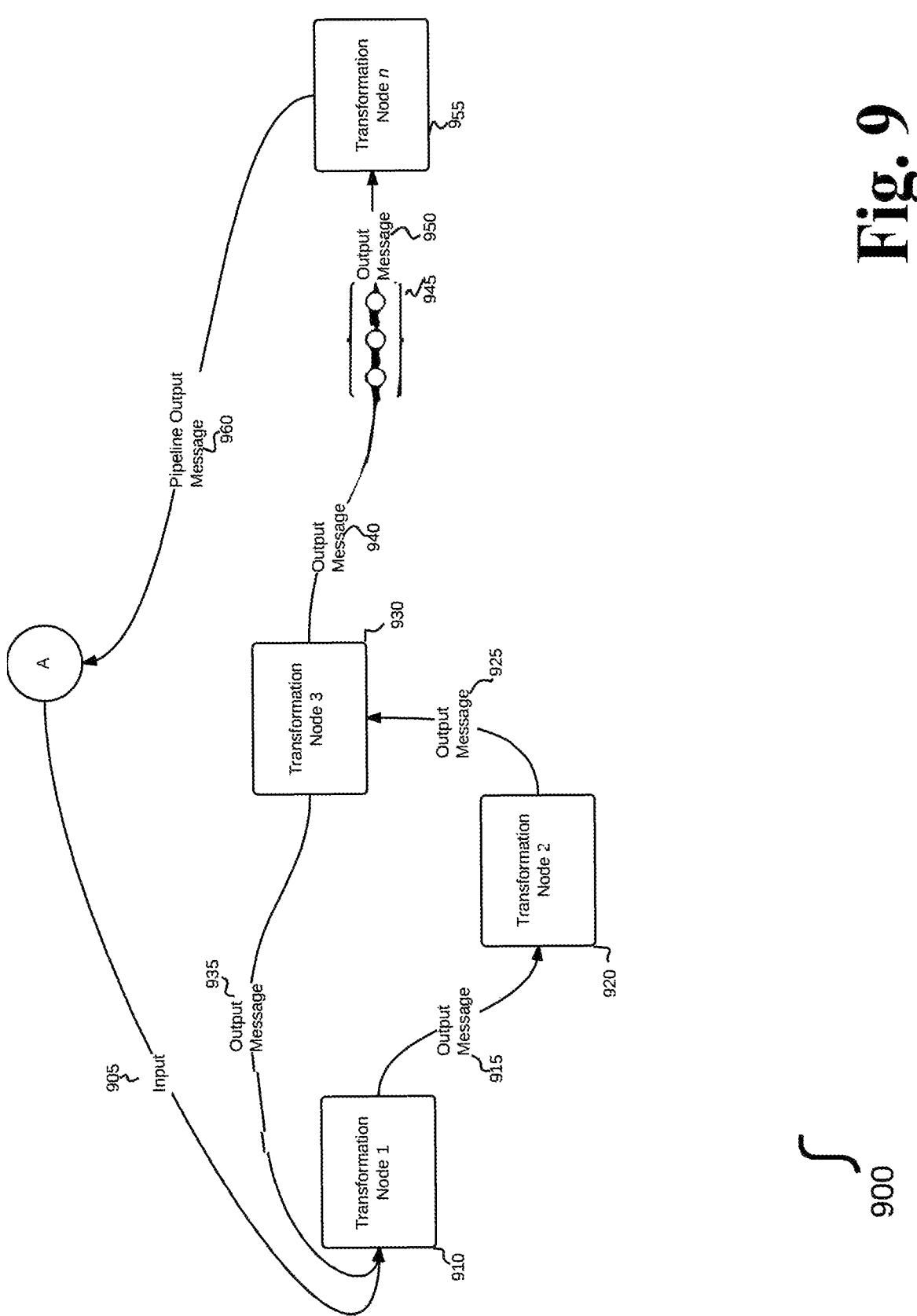

FIG. 9 is a diagram of an exemplary architecture for a transformation pipeline system where a set of three data transformations act to form a cyclical pipeline which also introduces the concept of the transformation pipeline as a directed graph of transformation nodes and messages according to an embodiment of the invention.

Figure 10:
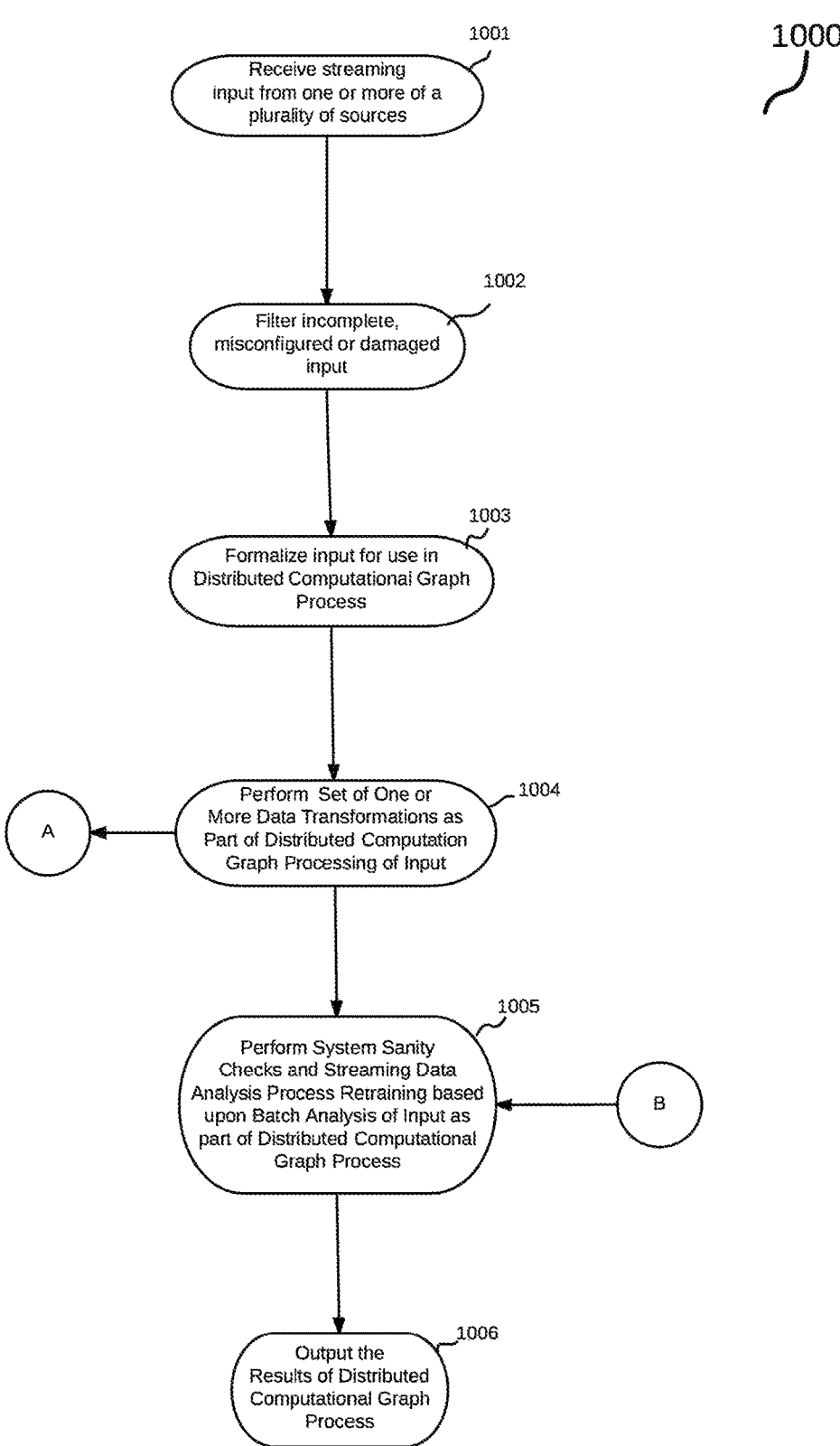

FIG. 10 is a process flow diagram of a method for the receipt, processing and predictive analysis of streaming data using a system of the invention.

Figure 11:
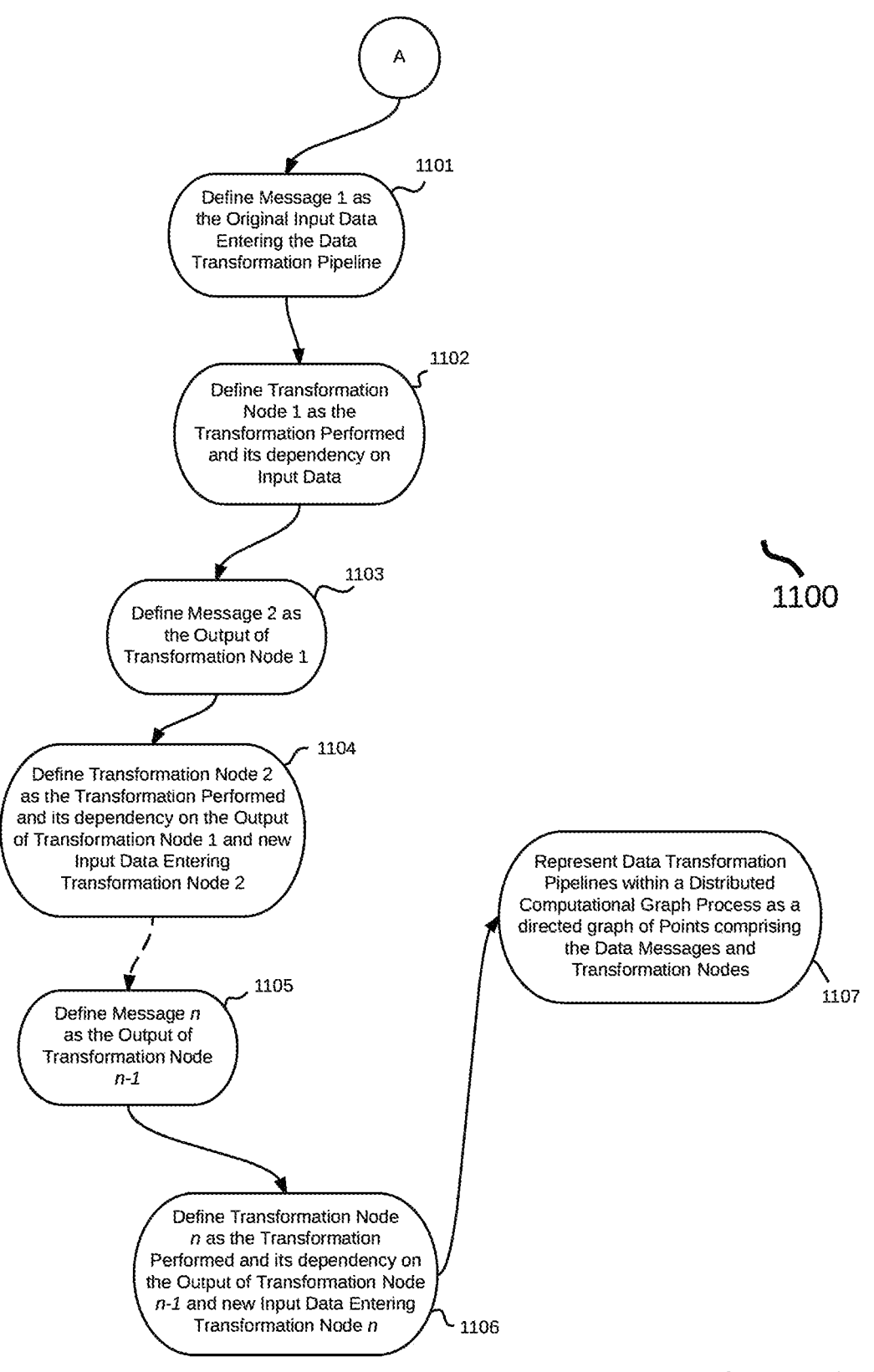

FIG. 11 is a process flow diagram of a method for representing the operation of the transformation pipeline as a directed graph function using a system of the invention.

Figure 12:
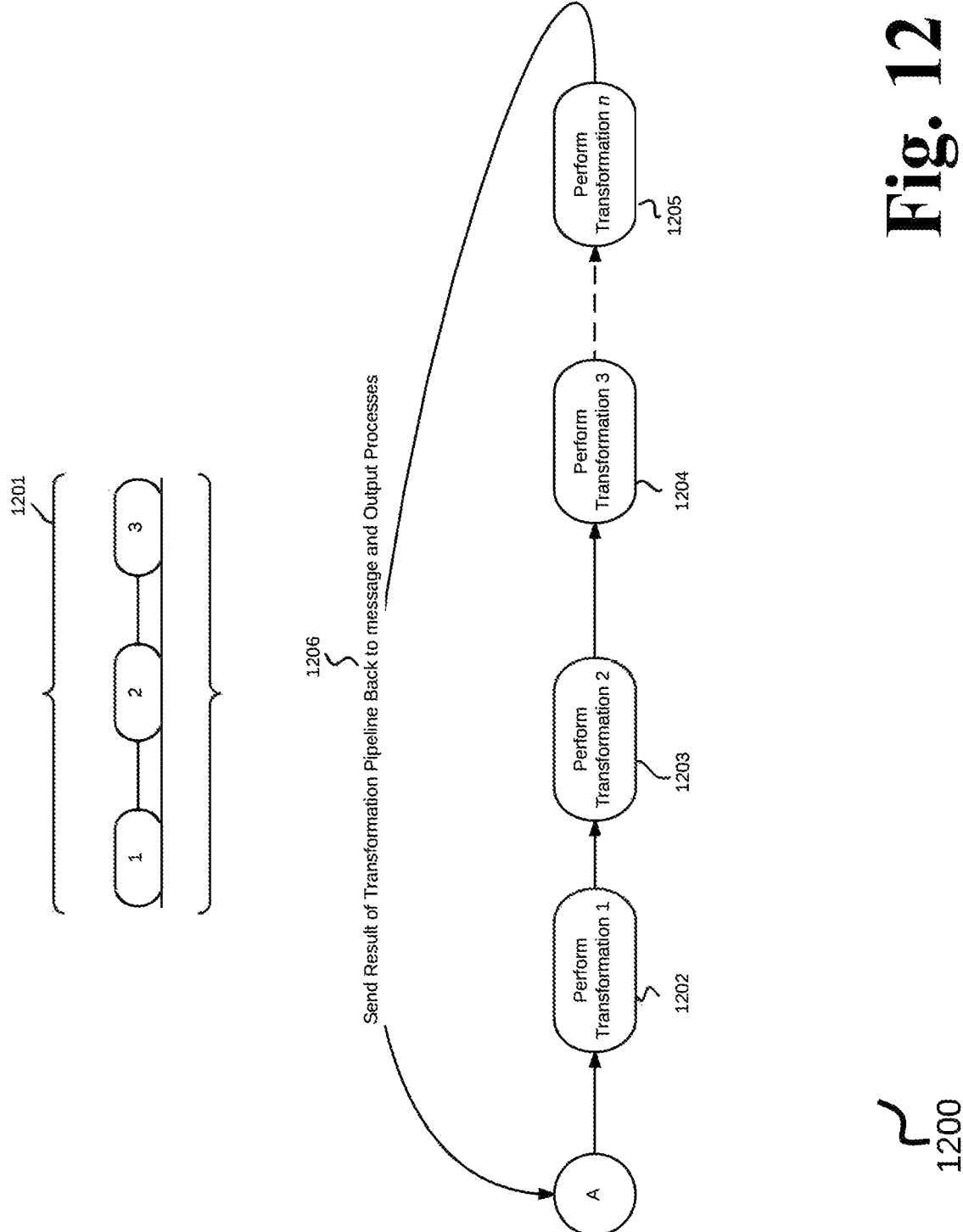

FIG. 12 is a process flow diagram of a method for a linear data transformation pipeline using a system of the invention.

Figure 13:
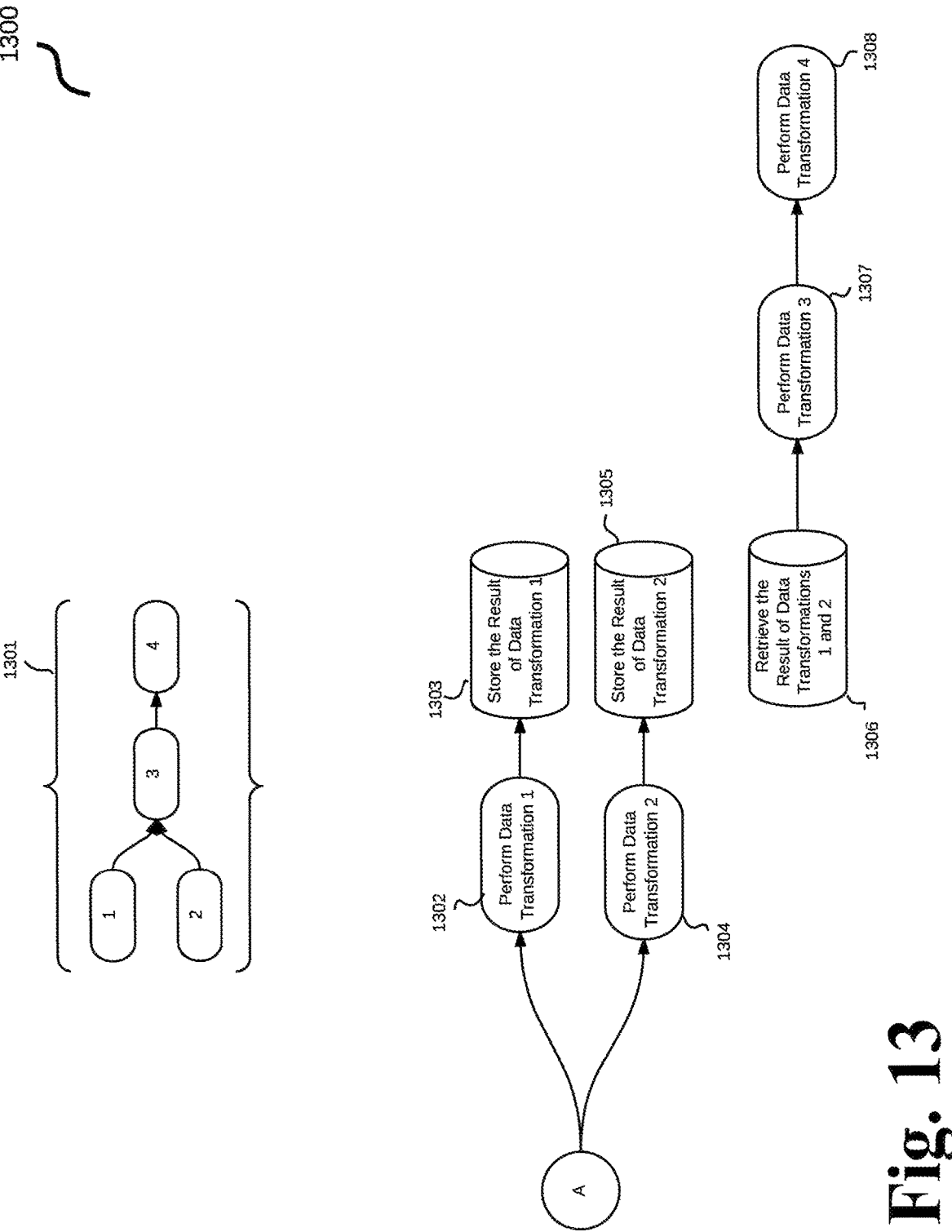

FIG. 13 is a process flow diagram of a method for the disposition of input from two antecedent data transformations into a single data transformation of transformation pipeline using a system of the invention.

Figure 14:
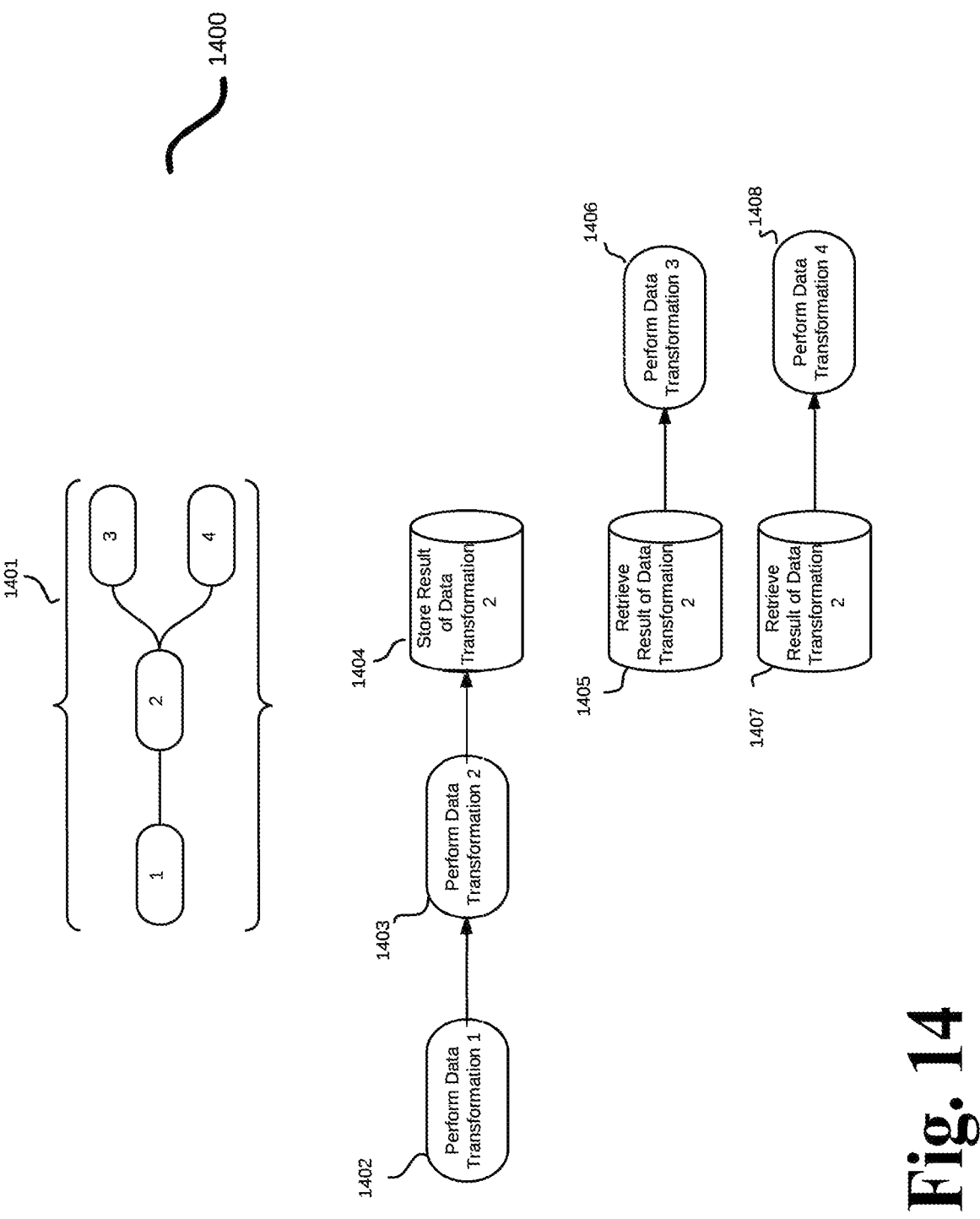

FIG. 14 is a process flow diagram of a method for the disposition of output of one data transformation that then serves as input to two postliminary data transformations using a system of the invention.

Figure 15:
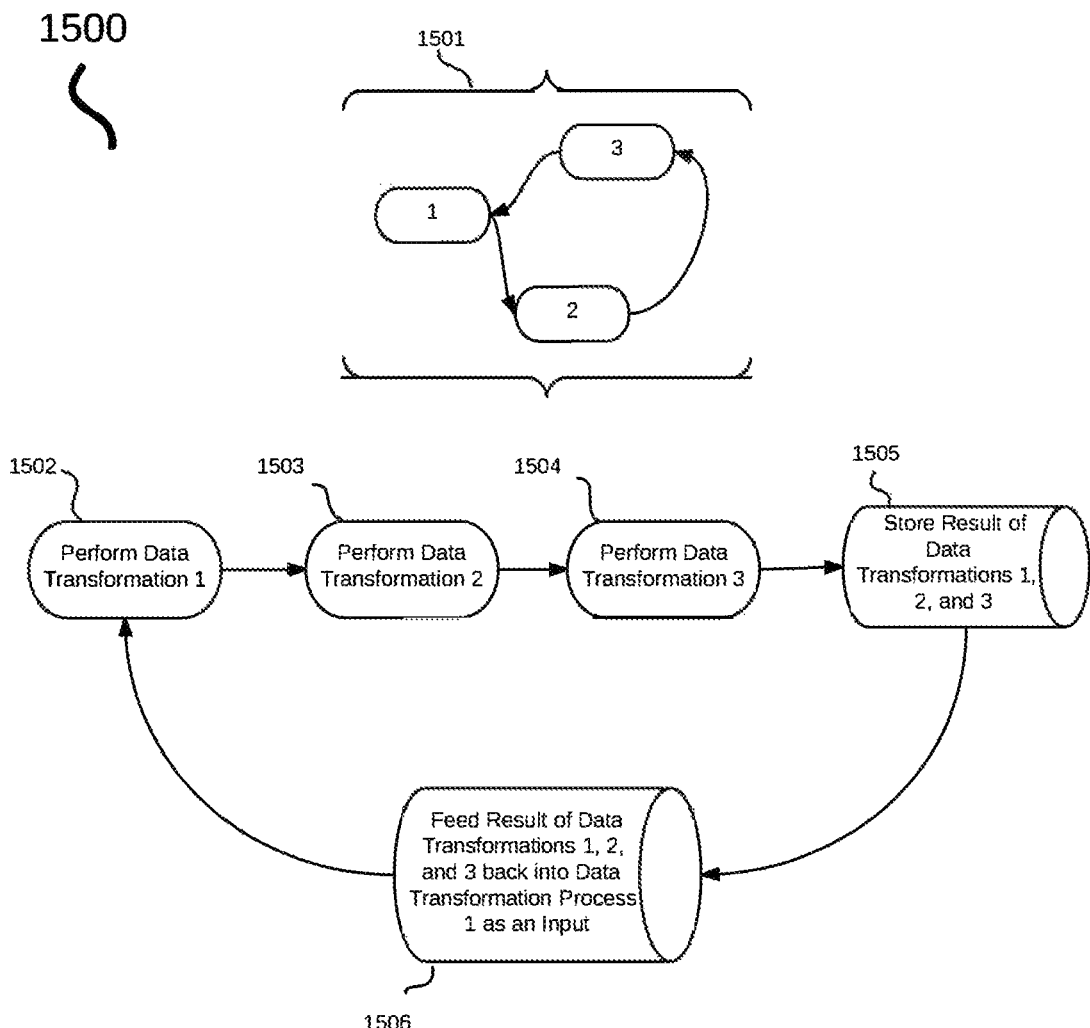

FIG. 15 is a process flow diagram of a method for processing a set of three or more data transformations within a data transformation pipeline where output of the last member transformation of the set serves as input of the first member transformation thereby creating a cyclical relationship using a system of the invention.

Figure 16:
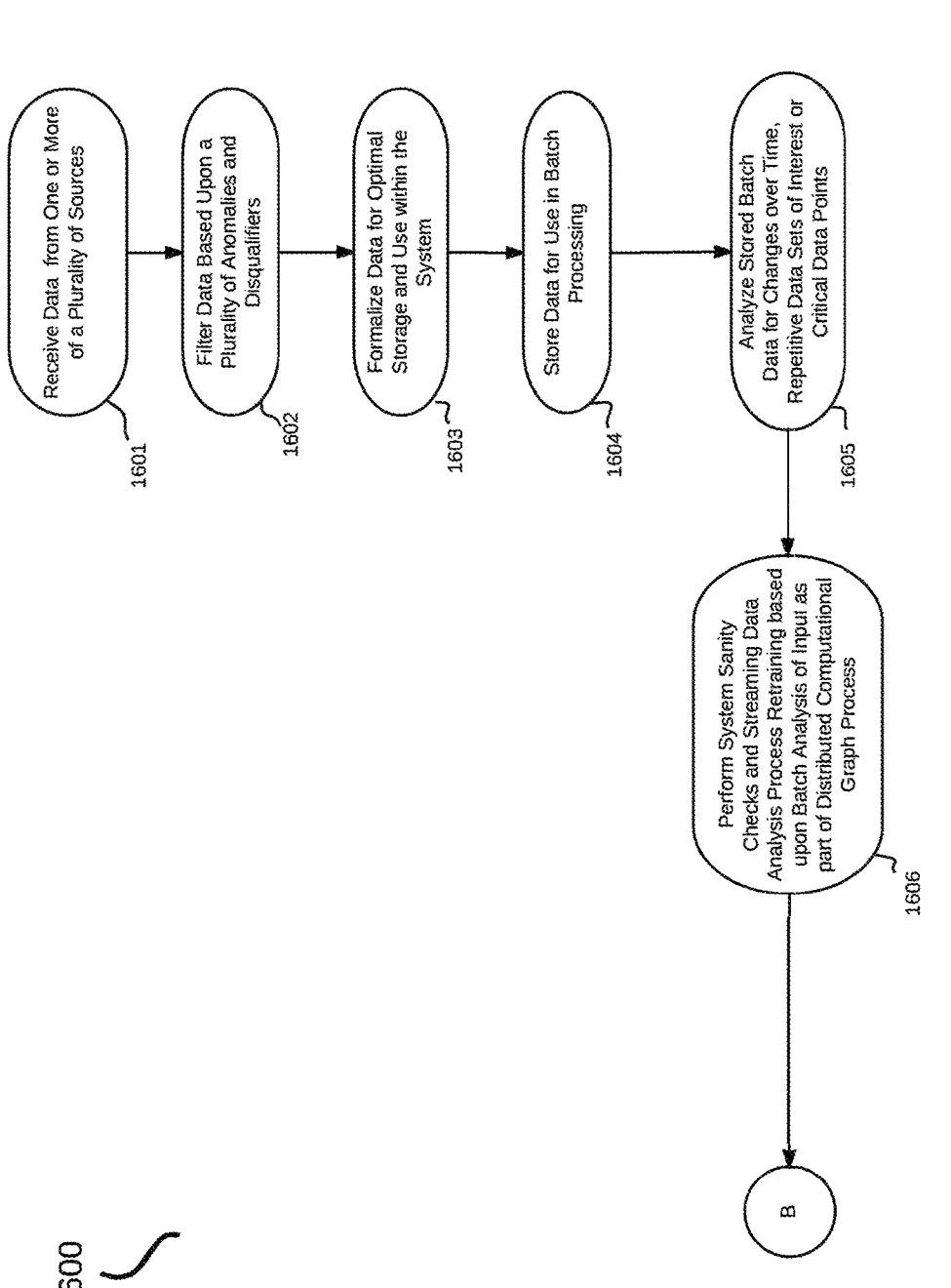

FIG. 16 is a process flow diagram of a method for the receipt and use of streaming data into batch storage and analysis of changes over time, repetition of specific data sequences or the presence of critical data points using a system of the invention.

DETAILED DESCRIPTION OF THE INVENTION

The inventor has conceived, and reduced to practice, various systems and methods for A system for repeatable and flexible predictive analysis of very large data sets using a distributed computational graph using a domain specific language for pipeline and resource declaration.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring sequentially (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Definitions

As used herein, "graph" is a representation of information and relationships, where each primary unit of information makes up a "node" or "vertex" of the graph and the relationship between two nodes makes up an edge of the graph. Nodes can be further qualified by the connection of one or more descriptors or "properties" to that node. For example, given the node "James R," name information for a person, qualifying properties might be "183 cm tall", "DOB 08/13/1965" and "speaks English". Similar to the use of properties to further describe the information in a node, a relationship between two nodes that forms an edge can be qualified using a "label". Thus, given a second node "Thomas G," an edge between "James R" and "Thomas G" that indicates that the two people know each other might be labeled "knows." When graph theory notation (Graph= (Vertices, Edges)) is applied this situation, the set of nodes are used as one parameter of the ordered pair, V and the set of 2 element edge endpoints are used as the second parameter of the ordered pair, E. When the order of the edge endpoints within the pairs of E is not significant, for example, the edge James R, Thomas G is equivalent to Thomas G, James R, the graph is designated as "undirected." Under circumstances when a relationship flows from one node to another in one direction, for example James R is "taller" than Thomas G, the order of the endpoints is significant. Graphs with such edges are designated as "directed." In the distributed computational graph system, transformations within transformation pipeline are represented as directed graph with each transformation comprising a node and the output messages between transformations comprising edges. Distributed computational graph stipulates the potential use of non-linear transformation pipelines which are programmatically linearized. Such linearization can result in exponential growth of resource consumption. The most sensible approach to overcome possibility is to introduce new transformation pipelines just as they are needed, creating only those that are ready to compute. Such method results in transformation graphs which are highly variable in size and node, edge composition as the system processes data streams. Those familiar with the art will realize that transformation graph may assume many shapes and sizes with a vast topography of edge relationships. The examples given were chosen for illustrative purposes only and represent a small number of the simplest of possibilities. These examples should not be taken to define the possible graphs expected as part of operation of the invention As used herein, "transformation" is a function performed on zero or more streams of input data which results in a single stream of output which may or may not then be used as input for another transformation. Transformations may comprise any combination of machine, human or machine-human interactions Transformations need not change data that enters them, one example of this type of transformation would be a storage transformation which would receive input and then act as a queue for that data for subsequent transformations. As implied above, a specific transformation may generate output data in the absence of input data. A time stamp serves as an example. In the invention, transformations are placed into pipelines such that the output of one transformation may serve as an input for another. These pipelines can consist of two or more transformations with the number of transformations limited only by the resources of the system. Historically, transformation pipelines have been linear with each transformation in the pipeline receiving input from one antecedent and providing output to one subsequent with no branching or iteration. Other pipeline configurations are possible. The invention is designed to permit several of these configurations including, but not limited to: linear, afferent branch, efferent branch and cyclical.

A "database" or "data storage subsystem" (these terms may be considered substantially synonymous), as used herein, is a system adapted for the long-term storage, indexing, and retrieval of data, the retrieval typically being via some sort of querying interface or language. "Database" may be used to refer to relational database management systems known in the art, but should not be considered to be limited to such systems. Many alternative database or data storage system technologies have been, and indeed are being, introduced in the art, including but not limited to distributed non-relational data storage systems such as Hadoop, column-oriented databases, in-memory databases, and the like. While various embodiments may preferentially employ one or another of the various data storage subsystems available in the art (or available in the future), the invention should not be construed to be so limited, as any data storage architecture may be used according to the embodiments. Similarly, while in some cases one or more particular data storage needs are described as being satisfied by separate components (for example, an expanded private capital markets database and a configuration database), these descriptions refer to functional uses of data storage systems and do not refer to their physical architecture. For instance, any group of data storage systems of databases referred to herein may be included together in a single database management system operating on a single machine, or they may be included in a single database management system operating on a cluster of machines as is known in the art. Similarly, any single database (such as an expanded private capital markets database) may be implemented on a single machine, on a set of machines using clustering technology, on several machines connected by one or more messaging systems known in the art, or in a master/slave arrangement common in the art. These examples should make clear that no particular architectural approaches to database management is preferred according to the invention, and choice of data storage technology is at the discretion of each implementer, without departing from the scope of the invention as claimed.

According to an aspect, a set of "validity rules" may be implemented to perform one or more data filtering steps described herein. Validity rules, as used herein, refer to a set of rules, policies, or controls which can be used to filter valid data from invalid data. For example, validity rules can comprise absence of all information, damage to data in the record, and presence of in-congruent information or missing information which invalidates the data record.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system possibly networked with others in a data processing center, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Figure 1:
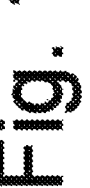
FIG. 1 is a block diagram illustrating an exemplary hardware architecture of a computing device used in various embodiments of the invention.

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more buses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100.

Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire, PCI, parallel, radio frequency (RF), Bluetooth, near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java compiler and may be executed using a Java virtual machine or equivalent, or files containing higher level code that may be executed by the computer using an interpreter (for example, scripts written in Python, Perl, Ruby, Groovy, or any other scripting language).

Figure 2:
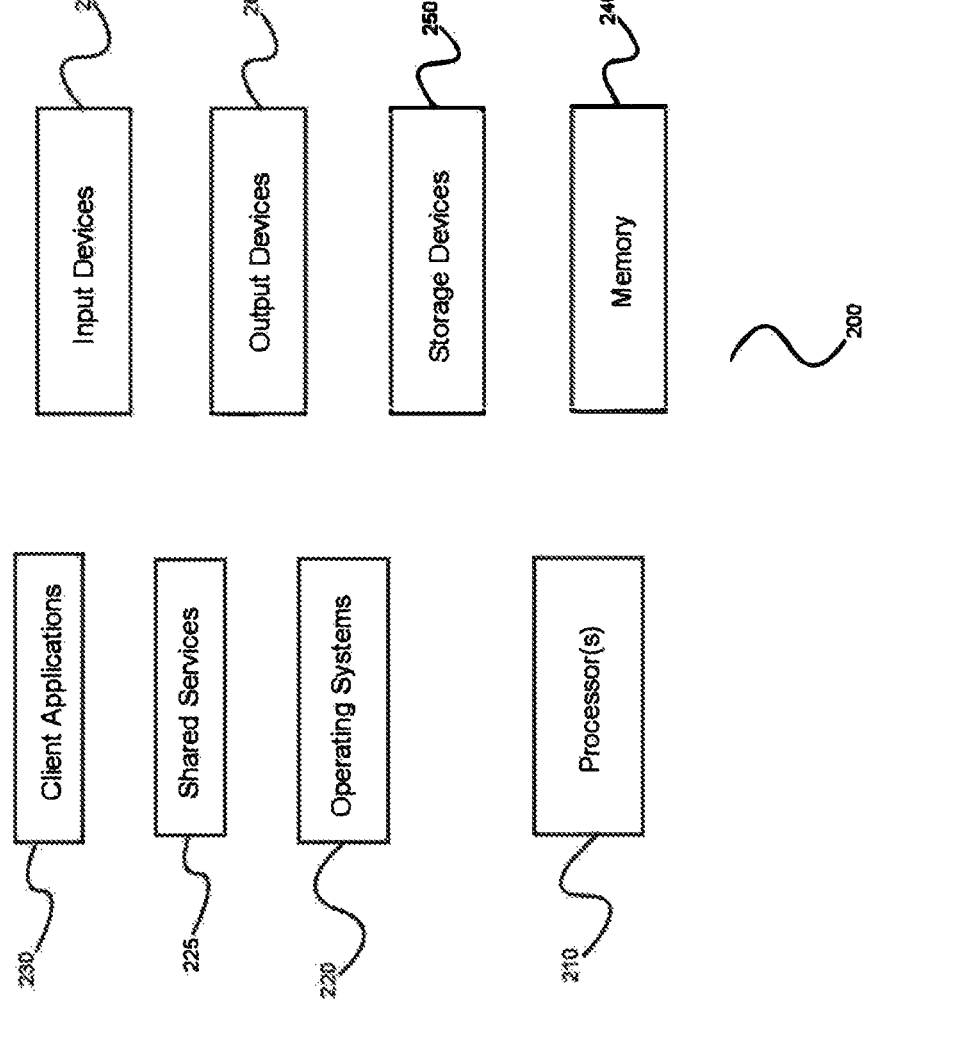
FIG. 2 is a block diagram illustrating an exemplary logical architecture for a client device, according to various embodiments of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows operating system, Apple's Mac OS/X or iOS operating systems, some variety of the Linux operating system, Google's Android operating system, or the like. In many cases, one or more shared services 225 may be operable in system 200, and may be useful for providing common services to client applications 230. Services 225 may for example be Windows services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
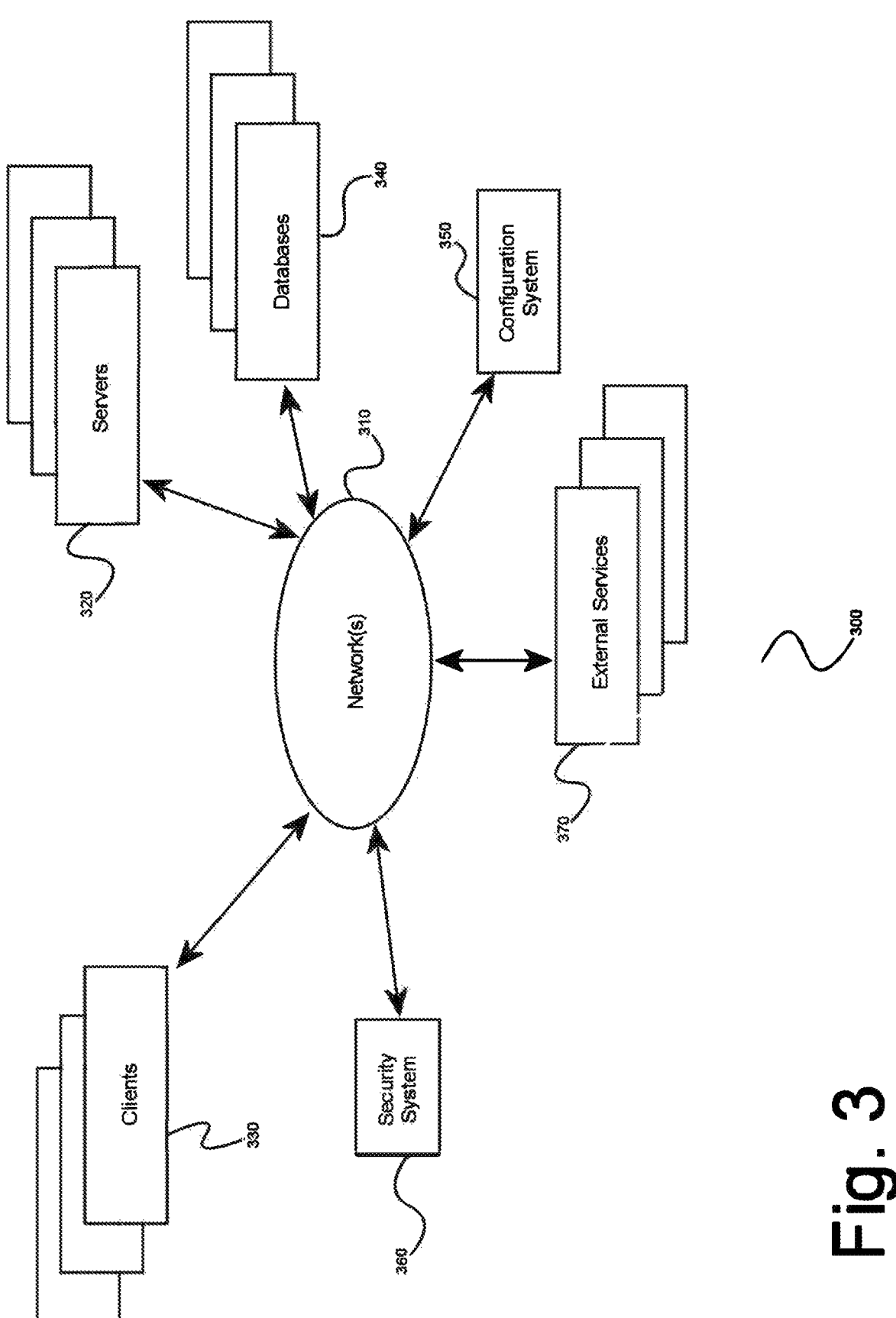
FIG. 3 is a block diagram illustrating an exemplary architectural arrangement of clients, servers, and external services, according to various embodiments of the invention.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330.

Clients 330 and servers 320 may communicate with one another via one or more electronic networks 310, which may be in various embodiments of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop, MapReduce, BigTable, and so forth). In some embodiments variant database architectures such as column-oriented databases, in-memory databases, clustered databases, distributed databases, key-value stores, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration 350 system or approach is specifically required by the description of any specific embodiment.

FIG. 4 shows an exemplary overview of a computer system 400 as may be used in any of the various locations throughout the system. It is exemplary of any computer that may execute code to process data. Various modifications and changes may be made to computer system 400 without departing from the broader scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

FIG. 5 is a block diagram of an exemplary architecture for a system 500 for predictive analysis of very large data sets using a distributed computational graph. According to the embodiment, streaming input feeds 510 may be a variety of data sources which may include but are not limited to the internet 511, arrays of physical sensors 512, database servers 513, electronic monitoring equipment 514 and direct human interaction 515 ranging from a relatively few number of participants to a large crowd sourcing campaign. Streaming data from any combinations of listed sources and those not listed may also be expected to occur as part of the operation of the invention as the number of streaming input sources is not limited by the design. All incoming streaming data may be passed through a data filter software module 520 to remove information that has been damaged in transit, is misconfigured, or is malformed in some way that precludes use. Many of the filter parameters may be expected to be preset prior to operation, however, design of the invention makes provision for the behavior of the filter software module 520 to be changed as progression of analysis requires through the automation of the system sanity and retrain software module 563 which may serve to optimize system operation and analysis function. The data stream may also be split into two identical substreams at the data filter software module 520 with one substream being fed into a streaming analysis pathway that includes the transformation pipeline software module 561 of the distributed computational graph 560. The other substream may be fed to data formalization software module 530 as part of the batch analysis pathway. The data formalization module 530 formats the data stream entering the batch analysis pathway of the invention into data records to be stored by the input event data store 540. The input event data store 540 can be a database of any architectural type known to those knowledgeable in the art, but based upon the quantity of the data the data store module would be expected to store and retrieve, options using highly distributed storage and map reduce query protocols, of which Hadoop is one, but not the only example, may be generally preferable to relational database schema.

Analysis of data from the input event data store may be performed by the batch event analysis software module 550. This module may be used to analyze the data in the input event data store for temporal information such as trends, previous occurrences of the progression of a set of events, with outcome, the occurrence of a single specific event with all events recorded before and after whether deemed relevant at the time or not, and presence of a particular event with all documented possible causative and remedial elements, including best guess probability information. Those knowledgeable in the art will recognize that while examples here focus on having stores of information pertaining to time, the use of the invention is not limited to such contexts as there are other fields where having a store of existing data would be critical to predictive analysis of streaming data 561. The search parameters used by the batch event analysis software module 550 are preset by those conducting the analysis at the beginning of the process, however, as the search matures and results are gleaned from the streaming data during transformation pipeline software module 561 operation, providing the system more timely event progress details, the system sanity and retrain software module 563 may automatically update the batch analysis parameters 550. Alternately, findings outside the system may precipitate the authors of the analysis to tune the batch analysis parameters administratively from outside the system 570, 562, 563. The real-time data analysis core 560 of the invention should be considered made up of a transformation pipeline software module 561, messaging module 562 and system sanity and retrain software module 563. The messaging module 562 has connections from both the batch and the streaming data analysis pathways and serves as a conduit for operational as well as result information between those two parts of the invention. The message module also receives messages from those administering analyses 580. Messages aggregated by the messaging module 562 may then be sent to system sanity and retrain software module 563 as appropriate. Several of the functions of the system sanity and retrain software module have already been disclosed. Briefly, this is software that may be used to monitor the progress of streaming data analysis optimizing coordination between streaming and batch analysis pathways by modifying or "retraining" the operation of the data filter software module 520, data formalization software module 530 and batch event analysis software module 540 and the transformation pipeline module 550 of the streaming pathway when the specifics of the search may change due to results produced during streaming analysis. System sanity and retrain module 563 may also monitor for data searches or transformations that are processing slowly or may have hung and for results that are outside established data stability boundaries so that actions can be implemented to resolve the issue. While the system sanity and retrain software module 563 may be designed to act autonomously and employs computer learning algorithms, according to some arrangements status updates may be made by administrators or potentially direct changes to operational parameters by such, according to the embodiment.

Streaming data entering from the outside data feeds 510 through the data filter software module 520 may be analyzed in real time within the transformation pipeline software module 561. Within a transformation pipeline, a set of functions tailored to the analysis being run are applied to the input data stream. According to the embodiment, functions may be applied in a linear, directed path or in more complex configurations. Functions may be modified over time during an analysis by the system sanity and retrain software module 563 and the results of the transformation pipeline, impacted by the results of batch analysis are then output in the format stipulated by the authors of the analysis which may be human readable printout, an alarm, machine readable information destined for another system or any of a plurality of other forms known to those in the art.

FIG. 6 is a block diagram of a preferred architecture for a transformation pipeline within a system for predictive analysis of very large data sets using distributed computational graph 600. According to the embodiment, streaming input from the data filter software module 520, 615 serves as input to the first transformation node 620 of the transformation pipeline. Transformation node's function is performed on input data stream and transformed output message 625 is sent to transformation node 2 630. The progression of transformation nodes 620, 630, 640, 650, 660 and associated output messages from each node 625, 635, 645, 655 is linear in configuration this is the simplest arrangement and, as previously noted, represents the current state of the art. While transformation nodes are described according to various embodiments as uniform shape (referring to FIGS. 6-9), such uniformity is used for presentation simplicity and clarity and does not reflect necessary operational similarity between transformations within the pipeline. It should be appreciated that one knowledgeable in the field will realize that certain transformations in a pipeline may be entirely self-contained; certain transformations may involve direct human interaction 630, such as selection via dial or dials, positioning of switch or switches, or parameters set on control display, all of which may change during analysis; other transformations may require external aggregation or correlation services or may rely on remote procedure calls to synchronous or asynchronous analysis engines as might occur in simulations among a plurality of other possibilities. Further according to the embodiment, individual transformation nodes in one pipeline may represent a function of another transformation pipeline. It should be appreciated that the node length of transformation pipelines depicted in no way confines the transformation pipelines employed by the invention to an arbitrary maximum length 640, 650, 660 as, being distributed, the number of transformations would be limited by the resources made available to each implementation of the invention. It should be further appreciated that there need be no limits on transform pipeline length. Output of the last transformation node and by extension, the transform pipeline 660 may be sent back to messaging software module 562 for predetermined action.

FIG. 7 is a block diagram of another preferred architecture for a transformation pipeline within a system for predictive analysis of very large data sets using distributed computational graph 700. According to the embodiment, streaming input from a data filter software module 520, 705 serves as input to the first transformation node 710 of the transformation pipeline. Transformation node's function is performed on input data stream and transformed output message 715 is sent to transformation node 2 720. In this embodiment, transformation node 2 720 has a second input stream 760. The specific source of this input is inconsequential to the operation of the invention and could be another transformation pipeline software module, a data store, human interaction, physical sensors, monitoring equipment for other electronic systems or a stream from the internet as from a crowdsourcing campaign, just to name a few possibilities 760. Functional integration of a second input stream into one transformation node requires the two input stream events be serialized. The invention performs this serialization using a decomposable transformation software module (not shown), the function of which is described below, referring to FIG. 13. While transformation nodes are described according to various embodiments as uniform shape (referring to FIGS. 6-9), such uniformity is used for presentation simplicity and clarity and does not reflect necessary operational similarity between transformations within the pipeline. It should be appreciated that one knowledgeable in the field will realize that certain transformations in a pipeline may be entirely self-contained; certain transformations may involve direct human interaction 630, such as selection via dial or dials, positioning of switch or switches, or parameters set on control display, all of which may change during analysis; other transformations may require external aggregation or correlation services or may rely on remote procedure calls to synchronous or asynchronous analysis engines as might occur in simulations among a plurality of other possibilities. Further according to the embodiment, individual transformation nodes in one pipeline may represent a function of another transformation pipeline. It should be appreciated that the node length of transformation pipelines depicted in no way confines the transformation pipelines employed by the invention to an arbitrary maximum length 710, 720, 730, 740, 750, as, being distributed, the number of transformations would be limited by the resources made available to each implementation of the invention. It should be further appreciated that there need be no limits on transform pipeline length. Output of the last transformation node and by extension, the transform pipeline, 750 may be sent back to messaging software module 562 for pre-decided action.

FIG. 8 is a block diagram of another preferred architecture for a transformation pipeline within a system for predictive analysis of very large data sets using distributed computational graph 700. According to the embodiment, streaming input from a data filter software module 520, 805 serves as input to the first transformation node 810 of the transformation pipeline. Transformation node's function is performed on input data stream and transformed output message 815 is sent to transformation node 2 820. In this embodiment, transformation node 2 820 sends its output stream to two transformation pipelines 830, 840, 850; 865, 875. This allows the same data stream to undergo two disparate, possibly completely unrelated, analyses without having to duplicate the infrastructure of the initial transform manipulations, greatly increasing the expressivity of the invention over current transform pipelines. Functional integration of a second output stream from one transformation node 820 requires that the two output stream events be serialized. The invention performs this serialization using a decomposable transformation software module (not shown), the function of which is described below, referring to FIG. 14. While transformation nodes are described according to various embodiments as uniform shape (referring to FIGS. 6-9), such uniformity is used for presentation simplicity and clarity and does not reflect necessary operational similarity between transformations within the pipeline. It should be appreciated that one knowledgeable in the field will realize that certain transformations in pipelines, which may be entirely self-contained; certain transformations may involve direct human interaction 630, such as selection via dial or dials, positioning of switch or switches, or parameters set on control display, all of which may change during analysis; other transformations may require external aggregation or correlation services or may rely on remote procedure calls to synchronous or asynchronous analysis engines as might occur in simulations, among a plurality of other possibilities. Further according to the embodiment, individual transformation nodes in one pipeline may represent a function of another transformation pipeline or another transformation pipeline. It should be appreciated that the node number of transformation pipelines depicted in no way confines the transformation pipelines employed by the invention to an arbitrary maximum length 810, 820, 830, 840, 850; 865, 875 as, being distributed, the number of transformations would be limited by the resources made available to each implementation of the invention. Further according to the embodiment, there need be no limits on transform pipeline length. Output of the last transformation node and by extension, the transform pipeline 850 may be sent back to messaging software module 562 for contemporary enabled action.

FIG. 9 is a block diagram of another preferred architecture for a transformation pipeline within a system for predictive analysis of very large data sets using distributed computational graph 700. According to the embodiment, streaming input from a data filter software module 520, 905 serves as input to the first transformation node 910 of the transformation pipeline. Transformation node's function may be performed on an input data stream and transformed output message 915 may then be sent to transformation node 2 920. Likewise, once the data stream is acted upon by transformation node 2 920, its output is sent to transformation node 3 930 using its output message 925 In this embodiment, transformation node 3 930 sends its output stream back to transform node 1 910 forming a cyclical relationship between transformation nodes 1 910, transformation node 2 920 and transformation node 3 930. Upon the achievement of some gateway result, the output of cyclical pipeline activity may be sent to downstream transformation nodes within the pipeline 940, 945. The presence of a generalized cyclical pathway construct allows the invention to be used to solve complex iterative problems with large data sets involved, expanding ability to rapidly retrieve conclusions for complicated issues. Functional creation of a cyclical transformation pipeline requires that each cycle be serialized. Cycle serialization may be performed using a decomposable transformation software module (not shown), the function of which is described below, referring to FIG. 15. While transformation nodes are described according to various embodiments as uniform shape (referring to FIGS. 6-9), such uniformity is used for presentation simplicity and clarity and does not reflect necessary operational similarity between transformations within the pipeline. It should be appreciated that one knowledgeable in the field will appreciate that certain transformations in pipelines, may be entirely self-contained; certain transformations may involve direct human interaction 630, such as selection via dial or dials, positioning of switch or switches, or parameters set on control display, all of which may change during analysis; still other transformations may require external aggregation or correlation services or may rely on remote procedure calls to synchronous or asynchronous analysis engines as might occur in simulations, among a plurality of other possibilities. Further according to the embodiment, individual transformation nodes in one pipeline may represent the cumulative function of another transformation pipeline. It should be appreciated that the node number of transformation pipelines depicted in no way confines the transformation pipelines employed by the invention to an arbitrary maximum length 910, 920, 930, 940, 950; 965, 975 as, being distributed, the number of transformations would be limited by the resources made available to each implementation of the invention. It should be further appreciated that there need be no limits on transform pipeline length. Output of the last transformation node and by extension, the transform pipeline 955 may be sent back to messaging software module 562 for concomitant enabled action.

Description of Method Embodiments

FIG. 10 is a process flow diagram of a method 1000 for predictive analysis of very large data sets using the distributed computational graph. One or more streams of data from a plurality of sources, which includes, but is in no way not limited to, a number of physical sensors, web based questionnaires and surveys, monitoring of electronic infrastructure, crowdsourcing campaigns, and direct human interaction, may be received by system 1001. The received stream is filtered 1002 to exclude data that has been corrupted, data that is incomplete or misconfigured and therefore unusable, data that may be intact but nonsensical within the context of the analyses being run, as well as a plurality of predetermined analysis related and unrelated criteria set by the authors. Filtered data may be split into two identical streams at this point (second stream not depicted for simplicity), wherein one substream may be sent for batch processing 1600 while another substream may be formalized 1003 for transformation pipeline analysis 1004, 561, 600, 700, 800, 900. Data formalization for transformation pipeline analysis acts to reformat the stream data for optimal, reliable use during analysis. Reformatting might entail, but is not limited to: setting data field order, standardizing measurement units if choices are given, splitting complex information into multiple simpler fields, and stripping unwanted characters, again, just to name a few simple examples. The formalized data stream may be subjected to one or more transformations. Each transformation acts as a function on the data and may or may not change the data. Within the invention, transformations working on the same data stream where the output of one transformation acts as the input to the next are represented as transformation pipelines. While the great majority of transformations in transformation pipelines receive a single stream of input, modify the data within the stream in some way and then pass the modified data as output to the next transformation in the pipeline, the invention does not require these characteristics. According to the embodiment, individual transformations can receive input of expected form from more than one source 1300 or receive no input at all as would a transformation acting as a timestamp. According to the embodiment, individual transformations, may not modify the data as would be encountered with a data store acting as a queue for downstream transformations 1303, 1305, 1405, 1407,1505. According to the embodiment, individual transformations may provide output to more than one downstream transformations 1400. This ability lends itself to simulations where multiple possible choices might be made at a single step of a procedure all of which need to be analyzed. While only a single, simple use case has been offered for each example, in each case, that example was chosen for simplicity of description from a plurality of possibilities, the examples given should not be considered to limit the invention to only simplistic applications. Last, according to the invention, transformations in a transformation pipeline backbone may form a linear, a quasi-linear arrangement or may be cyclical 1500, where the output of one of the internal transformations serves as the input of one of its antecedents allowing recursive analysis to be run. The result of transformation pipeline analysis may then be modified by results from batch analysis of the data stream 1600 and output in format predesigned by the authors of the analysis with could be human readable summary printout, human readable instruction printout, human-readable raw printout, data store, or machine encoded information of any format known to the art to be used in further automated analysis or action schema.

FIG. 11 is a process flow diagram of a method 1100 for an embodiment of modeling the transformation pipeline module 561 of the invention as a directed graph using graph theory. According to the embodiment, the individual transformations 1102, 1104, 1106 of the transformation pipeline $t_1 \ldots t_n$ such that each $t_i$ T are represented as graph nodes. Transformations belonging to T are discrete transformations over individual datasets $d_i$, consistent with classical functions. As such, each individual transformation $t_j$, receives a set of inputs and produces a single output. The input of an individual transformation $t_i$, is defined with the function in: $t_i$ $d_i$ . . . $d_k$ such that $in(t_i)=\{d_1 \ldots d_k\}$ and describes a transformation with k inputs. Similarly, the output of an individual transformation is defined as the function out: $t_i$ $[ld_i]$ to describe transformations that produce a single output (usable by other transformations). A dependency function can now be defined such that $dep(t_a, t_b)$ $out(t_a) in(t_b)$ The messages carrying the data stream through the transformation pipeline 1101,1103, 1105 make up the graph edges. Using the above definitions, then, a transformation pipeline within the invention can be defined as G=(V,E) where message($t_1$, $t_2$ . . . $t_{(n-1)}$, $t_n$) V and all transformations $t_1 \ldots t_n$ and all dependencies $dep(t_i, t_j)E$ 1107.

FIG. 12 is a process flow diagram of a method 1200 for one embodiment of a linear transformation pipeline 1201. This is the simplest of configurations as the input stream is acted upon by the first transformation node 1202 and the remainder of the transformations within the pipeline are then performed sequentially 1202, 1203, 1204, 1205 for the entire pipeline with no introduction of new data internal to the initial node or splitting output stream prior to last node of the pipeline 1205. This configuration is the current state of the art for transformation pipelines and is the most general form of these constructs. Linear transformation pipelines require no special manipulation to simplify the data pathway and are thus referred to as non-decomposable. The example depicted in this diagram was chosen to convey the configuration of a linear transformation pipeline and is the simplest form of the configuration felt to show the point. It in no way implies limitation of the invention.

FIG. 13 is a process flow diagram of a method 1300 for one embodiment of a transformation pipeline where one transformation node 1307 in a transformation pipeline receives data streams from two source transformation nodes 1301. The invention handles this transformation pipeline configuration by decomposing or serializing the input events 1302-1303, 1304-1305 heavily relying on post transformation function continuation. The results of individual transformation nodes 1302, 1304 just antecedent to the destination transformation node 1306 and placed into a single specialized data storage transformation node 1303, 1305 (shown twice as process occurs twice). The combined results then retrieved from the data store 1306 and serve as the input stream for the transformation node within the transformation pipeline backbone 1307, 1308. The example depicted in this diagram was chosen to convey the configuration of transformation pipelines with individual transformation nodes that receive input from two source nodes 1302, 1304 and is the simplest form of the configuration felt to show the point. It in no way implies limitation of the invention. One knowledgeable in the art will realize the great number of permutations and topologies possible, especially as the invention places no design restrictions on the number of transformation nodes receiving input from greater than one sources or the number sources providing input to a destination node.

FIG. 14 is a process flow diagram of a method 1400 for one embodiment of a transformation pipeline where one transformation node 1403 in a transformation pipeline sends output data stream to two destination transformation nodes 1401, 1406, 1408 in potentially two separate transformation pipelines. The invention handles this transformation pipeline configuration by decomposing or serializing the output events 1404,1405-1406, 1407-1408. The results of the source transformation node 1403 just antecedent to the destination transformation nodes 1406 and placed into a single specialized data storage transformation node 1404, 1405, 1407 (shown three times as storage occurs and retrieval occurs twice). The results of the antecedent transformation node may then be retrieved from a data store 1404 and serves as the input stream for the transformation nodes two downstream transformation pipeline 1406, 1408. The example depicted in this diagram was chosen to convey the configuration of transformation pipelines with individual transformation nodes that send output streams to two destination nodes 1406, 1408 and is the simplest form of the configuration felt to show the point. It in no way implies limitation of the invention. One knowledgeable in the art will realize the great number of permutations and topologies possible, especially as the invention places no design restrictions on the number of transformation nodes sending output to greater than one destination or the number destinations receiving input from a source node.

FIG. 15 is a process flow diagram of a method 1500 for one embodiment of a transformation pipeline where the topology of all or part of the pipeline is cyclical 1501. In this configuration the output stream of one transformation node 1504 acts as an input of an antecedent transformation node within the pipeline 1502 serialization or decomposition linearizes this cyclical configuration by completing the transformation of all of the nodes that make up a single cycle 1502, 1503, 1504 and then storing the result of that cycle in a data store 1505. That result of a cycle is then reintroduced to the transformation pipeline as input to the first transformation node of the cycle. As this configuration is by nature recursive, special programming to unfold the recursions was developed for the invention to accommodate it. The example depicted in this diagram was chosen to convey the configuration of transformation pipelines with individual transformation nodes that for a cyclical configuration 1501, 1502, 1503, 1504 and is the simplest form of the configuration felt to show the point. It in no way implies limitation of the invention. One knowledgeable in the art will realize the great number of permutations and topologies possible, especially as the invention places no design restrictions on the number of transformation nodes participating in a cycle nor the number of cycles in a transformation pipeline.

FIG. 16 is a process flow diagram of a method 1600 for one embodiment of the batch data stream analysis pathway which forms part of the invention and allows streaming data to be interpreted with historic context. One or more streams of data from a plurality of sources, which includes, but is in no way not limited to, a number of physical sensors, web based questionnaires and surveys, monitoring of electronic infrastructure, crowdsourcing campaigns, and direct human interaction, is received by the system 1601. The received stream may be filtered 1602 to exclude data that has been corrupted, data that is incomplete or misconfigured and therefore unusable, data that may be intact but nonsensical within the context of the analyses being run, as well as a plurality of predetermined analysis related and unrelated criteria set by the authors. Data formalization 1603 for batch analysis acts to reformat the stream data for optimal, reliable use during analysis. Reformatting might entail, but is not limited to: setting data field order, standardizing measurement units if choices are given, splitting complex information into multiple simpler fields, and stripping unwanted characters, again, just to name a few simple examples. The filtered and formalized stream is then added to a distributed data store 1604 due to the vast amount of information accrued over time. The invention has no dependency for specific data stores or data retrieval model. During transformation pipeline analysis of the streaming pipeline, data stored in the batch pathway store can be used to track changes in specifics of the data important to the ongoing analysis over time, repetitive data sets significant to the analysis or the occurrence of critical points of data 1605. The functions of individual transformation nodes 620 may be saved and can be edited also all nodes of a transformation pipeline 600 keep a summary or summarized view (analogous to a network routing table) of applicable parts of the overall route of the pipeline along with detailed information pertaining to adjacent two nodes. This framework information enables steps to be taken and notifications to be passed if individual transformation nodes 640 within a transformation pipeline 600 become unresponsive during analysis operations. Combinations of results from the batch pathway, partial and streaming output results from the transformation pipeline, administrative directives from the authors of the analysis as well as operational status messages from components of the distributed computational graph are used to perform system sanity checks and retraining of one or more of the modules of the system 1606. These corrections are designed to occur without administrative intervention under all but the most extreme of circumstances with deep learning capabilities present as part of the system manager and retrain module 563 responsible for this task.

The skilled person will be aware of a range of possible modifications of the various embodiments described above. Accordingly, the present invention is defined by the claims and their equivalents.

What is claimed is:

1. A computing system for a massively scalable compute platform, the computing system comprising:

one or more hardware processors configured for:

receiving streams of input from one or more of a plurality of data sources;

filtering data from the streams of input based on data validity rules;

instantiating, based on a pre-defined resource declaration in a domain-specific language, a graph comprising a plurality of data transformation pipelines, wherein each data transformation pipeline comprises a plurality of nodes implemented across a plurality of distributed computing devices, each node representing one or more functions that act on input data and produce output data and further comprises a plurality of edges that represent messages carrying data between individual nodes;

processing the streams of input using the graph; and during processing of the streams of input:

analyzing operational performance of one or more nodes of the graph;

reconfiguring one or more of the data transformation pipelines based on the resource declaration in the domain-specific language in response to the analyzed operational performance; and sending one or more output streams of transformed data to requesting devices on a network.

2. The computing system of claim 1, wherein the one or more hardware processors are further configured for:

formatting the data within the streams of input based upon a set of predetermined parameters to prepare the data for storage in an input event data store; and performing batch or stream analysis of stored data from the input event data store to determine at least one of: a set of trends in the stored data, a previous occurrence of a progression of a set of events found in the stored data, or an occurrence of a single specific event in the stored data.

3. The computing system of claim 1, wherein multiple antecedent node outputs are used as input to one node.

4. The computing system of claim 1, wherein output from one node acts as input to one or more downstream nodes.

5. The computing system of claim 1, wherein one or more of the data transformation pipelines comprises a cyclical subgraph configuration.

6. The computing system of claim 1, wherein the structure of one or more of the data transformation pipelines is a directed graph.

7. The computing system of claim 1, wherein at least one node within one or more of the data transformation pipelines operates as a data store and forms a queue for subsequent nodes to serialize effects of the one or more functions at branches of said one or more data transformation pipelines or at a head of a cyclical configuration of said one or more data transformation pipelines.

8. The computing system of claim 1, wherein the analysis of the operational performance of the one or more nodes of the graph is based on collected administrative execution and operational data associated with the graph; and wherein the collected administrative execution and operational data associated with the graph comprises at least one of: execution data, failure data, trigger data, and timing data.

9. The computing system of claim 8, wherein the collected administrative execution and operational data associated with the graph further comprises at least one of: resource usage and input or output data.

10. A computer-implemented method executed on a massively scalable compute platform, the computer-implemented method comprising:

receiving streams of input from one or more of a plurality of data sources;

filtering data from the streams of input based on data validity rules;

instantiating, based on a pre-defined resource declaration in a domain-specific language, a graph comprising a plurality of data transformation pipelines, wherein each data transformation pipeline comprises a plurality of nodes implemented across a plurality of distributed computing devices, each node representing one or more functions that act on input data and produce output data and further comprises a plurality of edges that represent messages carrying data between individual nodes;

processing the streams of input using the graph; and

during processing of the streams of input:

analyzing operational performance of one or more nodes of the graph;

reconfiguring one or more of the data transformation pipelines based on the resource declaration in the domain-specific language in response to the analyzed operational performance; and sending one or more output streams of transformed data to requesting devices on a network.

11. The computer-implemented method of claim 10, further comprising the steps of:

formatting the data within the streams of input based upon a set of predetermined parameters to prepare the data for storage in an input event data store; and performing batch or stream analysis of stored data from the input event data store to determine at least one of: a set of trends in the stored data, a previous occurrence of a progression of a set of events found in the stored data, or an occurrence of a single specific event in the stored data.

12. The computer-implemented method of claim 10, wherein multiple antecedent node outputs are used as input to one node.

13. The computer-implemented method of claim 10, wherein output from one node acts as input to one or more downstream nodes.

14. The computer-implemented method of claim 10, wherein one or more of the data transformation pipelines comprises a cyclical subgraph configuration.

15. The computer-implemented method of claim 10, wherein the structure of one or more of the data transformation pipelines is a directed graph.

16. The computer-implemented method of claim 10, wherein at least one node within one or more of the data transformation pipelines operates as a data store and forms a queue for subsequent nodes to serialize effects of the one or more functions at branches of said one or more data transformation pipelines or at a head of a cyclical configuration of said one or more data transformation pipelines.

17. The computer-implemented method of claim 10, wherein the analysis of the operational performance of the one or more nodes of the graph is based on collected administrative execution and operational data associated with the graph; and wherein the collected administrative execution and operational data associated with the graph comprises at least one of: execution data, failure data, trigger data, and timing data.

18. The computer-implemented method of claim 17, wherein the collected administrative execution and operational data associated with the graph further comprises at least one of: resource usage and input or output data.

19. A system for a massively scalable compute platform, comprising one or more computers with executable instructions that, when executed, cause the system to:

receive streams of input from one or more of a plurality of data sources;

filter data from the streams of input based on data validity rules;

instantiate, based on a pre-defined resource declaration in a domain-specific language, a graph comprising a plurality of data transformation pipelines, wherein each data transformation pipeline comprises a plurality of nodes implemented across a plurality of distributed computing devices, each node representing one or more functions that act on input data and produce output data and further comprises a plurality of edges that represent messages carrying data between individual nodes;

process the streams of input using the graph; and during processing of the streams of input:

analyze operational performance of one or more nodes of the graph;

reconfigure one or more of the data transformation pipelines based on the resource declaration in the domain-specific language in response to the analyzed operational performance; and send one or more output streams of transformed data to requesting devices on a network.

20. The system of claim 19, wherein the system is further caused to:

format the data within the streams of input based upon a set of predetermined parameters to prepare the data for storage in an input event data store; and perform batch or stream analysis of stored data from the input event data store to determine at least one of: a set of trends in the stored data, a previous occurrence of a progression of a set of events found in the stored data, or an occurrence of a single specific event in the stored data.

21. The system of claim 19, wherein multiple antecedent node outputs are used as input to one node.

22. The system of claim 19, wherein output from one node acts as input to one or more downstream nodes.

23. The system of claim 19, wherein one or more of the data transformation pipelines comprises a cyclical subgraph configuration.

24. The system of claim 19, wherein the structure of one or more of the data transformation pipelines is a directed graph.

25. The system of claim 19, wherein at least one node within one or more of the data transformation pipelines operates as a data store and forms a queue for subsequent nodes to serialize effects of the one or more functions at branches of said one or more data transformation pipelines or at a head of a cyclical configuration of said one or more data transformation pipelines.

26. The system of claim 19, wherein the analysis of the operational performance of the one or more nodes of the graph is based on collected administrative execution and operational data associated with the graph; and wherein the collected administrative execution and operational data associated with the graph comprises at least one of: execution data, failure data, trigger data, and timing data.

27. The system of claim 26, wherein the collected administrative execution and operational data associated with the graph further comprises at least one of:

resource usage and input or output data.

28. Non-transitory, computer-readable storage media having computer executable instructions embodied thereon that, when executed by one or more processors of a computing system employing a massively scalable compute platform, cause the computing system to:

receive streams of input from one or more of a plurality of data sources;

filter data from the streams of input based on data validity rules;

instantiate, based on a pre-defined resource declaration in a domain-specific language, a graph comprising a plurality of data transformation pipelines, wherein each data transformation pipeline comprises a plurality of nodes implemented across a plurality of distributed computing devices, each node representing one or more functions that act on input data and produce output data and further comprises a plurality of edges that represent messages carrying data between individual nodes;

process the streams of input using the graph; and during processing of the streams of input:

analyze operational performance of one or more nodes of the graph;

reconfigure one or more of the data transformation pipelines based on the resource declaration in the domain-specific language in response to the analyzed operational performance; and send one or more output streams of transformed data to requesting devices on a network.

29. The non-transitory, computer-readable storage media of claim 28, wherein the computing system is further caused to:

format the data within the streams of input based upon a set of predetermined parameters to prepare the data for storage in an input event data store; and perform batch or stream analysis of stored data from the input event data store to determine at least one of: a set of trends in the stored data, a previous occurrence of a progression of a set of events found in the stored data, or an occurrence of a single specific event in the stored data.

30. The non-transitory, computer-readable storage media of claim 28, wherein multiple antecedent node outputs are used as input to one node.

31. The non-transitory, computer-readable storage media of claim 28, wherein output from one node acts as input to one or more downstream nodes.

32. The non-transitory, computer-readable storage media of claim 28, wherein one or more of the data transformation pipelines comprises a cyclical subgraph configuration.

33. The non-transitory, computer-readable storage media of claim 28 wherein the structure of one or more of the data transformation pipelines is a directed graph.

34. The non-transitory, computer-readable storage media of claim 28, wherein at least one node within one or more of the data transformation pipelines operates as a data store and forms a queue for subsequent nodes to serialize effects of the one or more functions at branches of said one or more data transformation pipelines or at a head of a cyclical configuration of said one or more data transformation pipelines.

35. The non-transitory, computer-readable storage media of claim 28, wherein the analysis of the operational performance of the one or more nodes of the graph is based on collected administrative execution and operational data associated with the graph; and wherein the collected administrative execution and operational data associated with the graph comprises at least one of: execution data, failure data, trigger data, and timing data.

36. The non-transitory, computer-readable storage media of claim 35, wherein the collected administrative execution and operational data associated with the graph further comprises at least one of: resource usage and input or output data.

* * * * *